(12) United States Patent
Nakazono et al.

(10) Patent No.: US 11,468,539 B2
(45) Date of Patent: Oct. 11, 2022

(54) IMAGE PROCESSING DEVICE AND IMAGING DEVICE

(71) Applicant: OLYMPUS CORPORATION, Hachioji (JP)

(72) Inventors: Keisuke Nakazono, Tokyo (JP); Akira Ueno, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 375 days.

(21) Appl. No.: 16/733,404

(22) Filed: Jan. 3, 2020

(65) Prior Publication Data
US 2020/0143508 A1 May 7, 2020

Related U.S. Application Data

(63) Continuation of application No. PCT/JP2018/025840, filed on Jul. 9, 2018.

(51) Int. Cl.
*G06T 1/20* (2006.01)
*H04N 5/232* (2006.01)
(Continued)

(52) U.S. Cl.
CPC .............. *G06T 1/20* (2013.01); *G06F 13/20* (2013.01); *H04N 1/2112* (2013.01); *H04N 5/232* (2013.01)

(58) Field of Classification Search
CPC ......... G06T 1/20; G06F 13/20; G06F 15/173; H04N 1/2112; H04N 5/232; Y02D 10/00
See application file for complete search history.

(56) References Cited

U.S. PATENT DOCUMENTS 10,241,721 B2    3/2019   Nakazono et al.
10,509,762 B2 *  12/2019  Peleska ................. H04W 52/02
(Continued)

FOREIGN PATENT DOCUMENTS

JP    2008-301090 A    12/2008
JP    2008-310649 A    12/2008
(Continued)

OTHER PUBLICATIONS

International Search Report dated Jul. 31, 2018, issued in counterpart International Application No. PCT/JP2018/025840, w/English translation (4 pages).
(Continued)

*Primary Examiner* — Hung H Lam
(74) *Attorney, Agent, or Firm* — WHDA, LLP

(57) ABSTRACT

An image processing device includes a plurality of processing units which are connected to a common data bus and performing predetermined processing on data read from a data storage unit connected to the data bus via the data bus. At least one of the processing units includes: a plurality of processing modules that are configured to perform predetermined processing on input data; an input/output module that is configured to operate as the processing module that directly inputs and outputs data from/to outside without passing through the data bus; and a connection switching unit that is configured to change a configuration of a pipeline by switching a connection between the processing modules according to input settings, and is an image processing unit that are configured to perform a pipeline processing by each of the processing modules constituting the pipeline.

8 Claims, 7 Drawing Sheets

(51) Int. Cl.
*G06F 13/20* (2006.01)
*H04N 1/21* (2006.01)

(56) References Cited

U.S. PATENT DOCUMENTS

| | | | |
|---|---|---|---|
| 10,803,589 B2* | 10/2020 | Ikeda | G06T 7/11 |
| 2003/0007703 A1* | 1/2003 | Roylance | G06T 1/20 |
| | | | 382/303 |
| 2005/0248584 A1* | 11/2005 | Takeo | G06F 13/4027 |
| | | | 345/603 |
| 2008/0313439 A1 | 12/2008 | Suzuki | |
| 2010/0050026 A1 | 2/2010 | Okabe | |
| 2014/0136474 A1* | 5/2014 | Hom | G06F 9/544 |
| | | | 707/607 |
| 2018/0074752 A1 | 3/2018 | Nakazono et al. | |
| 2018/0365796 A1 | 12/2018 | Nakazono et al. | |

FOREIGN PATENT DOCUMENTS

| | | |
|---|---|---|
| JP | 2009-87202 A | 4/2009 |
| JP | 2010-49500 A | 3/2010 |
| JP | 2013-196509 A | 9/2013 |
| JP | 2014-182510 A | 9/2014 |

OTHER PUBLICATIONS

International Search Report dated Aug. 29, 2017, issued in counterpart International Application No. PCT/JP2017/026672, w/English translation (4 pages).

Non-Final Office Action dated Jun. 10, 2020, issued in U.S. Appl. No. 16/568,578 (12 pages).

* cited by examiner

IMAGE PROCESSING DEVICE AND IMAGING DEVICE

CROSS REFERENCE TO RELATED APPLICATIONS

This application is a continuation application based on a PCT Patent Application No. PCT/JP2018/025840, filed on Jul. 9, 2018, whose priority is claimed on PCT Patent Application No. PCT/JP2017/026672, filed on Jul. 24, 2017. The contents of both of the PCT Applications are incorporated herein by reference.

BACKGROUND

Technical Field

The present invention relates to an image processing device and an imaging device.

Background Art

In an imaging device such as a still image camera, a moving image camera, a medical endoscope camera, or an industrial endoscope camera, various image processing is performed by an image processing device such as a mounted system LSI. Therefore, it is desirable that the image processing device be provided with an image processing function for realizing the function installed in the imaging device.

Further, in recent years, high definition of a display device for displaying an image captured by an imaging device has been advanced. For example, a display device can display an image having a resolution of full HD size (1920×1080) compatible with high definition television (HDTV) or a resolution of 4K size (3840×2160) compatible with ultra high definition television (UHDTV). Furthermore, it is also planned that a display device displays an image having a resolution of 8K size (7680×4320) in which the 4K size is further refined.

For this reason, also in an image processing device mounted in an imaging device, it is required to cope with a higher definition image. That is, it has become necessary to provide an image processing device with an image processing function corresponding to a high resolution image such as 4K size or 8K size, or a high frame rate image.

By the way, in a lot of image processing devices mounted in an imaging device, a plurality of processing blocks incorporated to realize an image processing function are configured to share one DRAM (Dynamic Random Access Memory) connected to the image processing device. In such an image processing device, a plurality of built-in processing blocks are connected to an internal data bus of the image processing device, and each processing block is connected by DMA (Direct Memory Access) via the data bus to access the DRAM.

Therefore, in the image processing device, the amount of data handled in the image processing, that is, the bus bandwidth required for each processing block to access the DRAM changes depending on the resolution and frame rate of the image to be subjected to the image processing. That is, if the image processing device is provided with an image processing function corresponding to a high resolution image or a high frame rate image, the amount of data handled in the image processing increases, and the necessary DRAM bus bandwidth also increases. Further, in an image processing device corresponding to a high resolution image or a high frame rate image, each of a plurality of built-in processing blocks also needs to operate at high speed.

Among the processing blocks included in the image processing device, there is also a processing block that are configured to perform pipeline processing by connecting a plurality of processing modules in series. For example, in the image processing device, an image processing unit that are configured to perform a series of image processing in the imaging device is a processing block configured to perform pipeline processing. In the image processing device having such a configuration, it is possible to realize a high speed processing of a series of image processing in the imaging device by a pipeline processing in the image processing unit in which a plurality of image processing modules for performing respective image processing are connected in series.

Further, in the image processing device having such a configuration, since the image processing modules that are configured to perform pipeline processing do not access the DRAM except for the processing modules on the data input side and the data output side provided in the image processing unit, it is possible to avoid the compression of the bus band of the DRAM at the time of image processing and to reduce the power consumption of the image processing device.

On the other hand, various types of imaging devices are developed according to the installed functions, processing capabilities (speed), or the price thereof. Then, developing an image processing device having a necessary image processing function for each model developed in the imaging device is not a useful means from the viewpoint of the development period and cost of the image processing device.

Therefore, it is considered to develop as one image processing device a high-performance image processing device with a lot of image processing functions including correspondence to high-resolution images, and install it commonly in all developed imaging devices.

However, in the high-performance image processing device, the area required for mounting and the power consumption for operation increase. In addition, a high-performance image processing device is very expensive. Then, a high-performance image processing device becomes difficult to mount in an imaging device equipped with a small number of functions from the viewpoint of downsizing, low power consumption, and price reduction of the imaging device.

Therefore, conventionally, various image processing device technologies have been proposed in which the image processing function to be implemented has extensibility. For example, Japanese Unexamined Patent Application, First Publication No. 2008-301090 discloses a technology for realizing various image processing devices having different functions by a plurality of ASICs. More specifically, in this patent document, a low-function image processing device is realized at optimum cost using only a basic function ASIC having a minimum function necessary for image processing, and a multifunctional high-performance image processing device is realized using a high-performance ASIC having a basic function ASIC and many functions.

Therefore, by applying the technology disclosed in this patent document to an imaging device, it is considered that various types of imaging devices can be developed. In other words, by mounting only the low-performance image processing device, a low-cost imaging device may be realized, and by mounting both the low-performance image processing device and the high-performance image processing device, a high-performance imaging may be realized.

SUMMARY

An image processing device includes: a plurality of processing units which are connected to a common data bus and performing predetermined processing on data read from a data storage unit connected to the data bus via the data bus. At least one of the processing units includes: a plurality of processing modules that are configured to perform predetermined processing on input data; an input/output module that is configured to operate as the processing module that directly inputs data from and outputs data to outside without passing through the data bus; and a connection switching unit that is configured to change a configuration of a pipeline by switching a connection between the processing modules according to input settings. The processing unit performing a pipeline processing by each of the processing modules constituting the pipeline. The image processing device further includes: an operation detection unit that is configured to detect an operation of each of the processing units; an input/output position determination unit that is configured to determine the configuration of the pipeline in the image processing unit according to information on the operation of each of the processing units detected by the operation detection unit; an information output unit that is configured to output information on the configuration of the pipeline determined by the input/output position determination unit to outside; and an information input unit that is configured to receive information on the configuration of the pipeline from the outside. The connection switching unit is configured to switch the connection between processing modules constituting the pipeline according to the information of the configuration of the pipeline determined by the input/output position determination unit or received by the information input unit.

The operation detection unit may detect an operation involving an access to the data storage unit via the data bus by each of the processing units, as an operation of each of the processing units. The input/output position determination unit may determine the configuration of the pipeline for dividing the pipeline processing to be performed in the image processing unit, so that a total bandwidth of the data bus required when each of the processing units accesses the data storage unit via the data bus is within a maximum bandwidth of the data storage unit connected to the data bus.

The input/output position determination unit may determine a position of the input/output module incorporated in the pipeline configured in the image processing unit, to divide the pipeline processing to be performed in the image processing unit.

An output of the input/output module provided in the image processing device in a previous stage and an input of the input/output module provided in the image processing device in a subsequent stage may be connected, so that the image processing devices are connected in a series connection. The connection switching unit in the image processing unit provided in each of the image processing devices may switch a connection between the processing modules in the pipeline configured in the image processing unit, according to information of the configuration of the pipeline determined by the input/output position determination unit provided in any one of the image processing devices.

The input/output position determination unit provided in any one of the image processing devices may determine the configuration of the pipeline including a position of the input/output module to be incorporated into the pipeline configured in each of the image processing units, in order to share the pipeline processing in each of the image processing units according to information on operation of each of the processing units detected by the corresponding operation detection unit. The information output unit provided in any one of the image processing devices may output information on the configuration of the pipeline determined by the input/output position determination unit to the information input unit provided in another image processing device. The connection switching unit in the image processing unit provided in each of the image processing devices may incorporate the input/output module into a position of the input/output module included in information of the configuration of the pipeline determined by the input/output position determination unit or received by the corresponding information input unit, thereby switching connections between the processing modules in the pipeline configured in the processing unit.

The input/output position determination unit provided in any one of the image processing devices may determine a position of the input/output module to be incorporated in the pipeline configured in each of the image processing units, so that a total bandwidth of the data bus required when accessing the data storage unit via the data bus corresponding to each processing unit which performs processing in each of the image processing devices is set within a maximum bandwidth in the data storage unit connected to the corresponding data bus.

An output of the input/output module provided in the image processing device in a last stage connected in the series connection and an input of the input/output module provided in the image processing device in a first stage may be all connected, and all the image processing devices may be connected in an annular shape. Data processed by each of the image processing devices may be collected in the data storage unit connected to the data bus of any one of the image processing devices.

An imaging device may include a plurality of the image processing devices. In each of the image processing devices, an output of the input/output module provided in the image processing device of a previous stage and an input of the input/output module provided in the image processing device of a subsequent stage may be connected via an external image processing device that performs other image processing. The connection switching unit in the image processing unit provided in each of the image processing devices may switch a connection between the processing modules in the pipeline configured in the image processing unit, according to information of configuration of the pipeline determined by the input/output position determination unit provided in any one of the image processing devices.

DETAILED DESCRIPTION OF THE PREFERRED EMBODIMENTS

Figure 1:
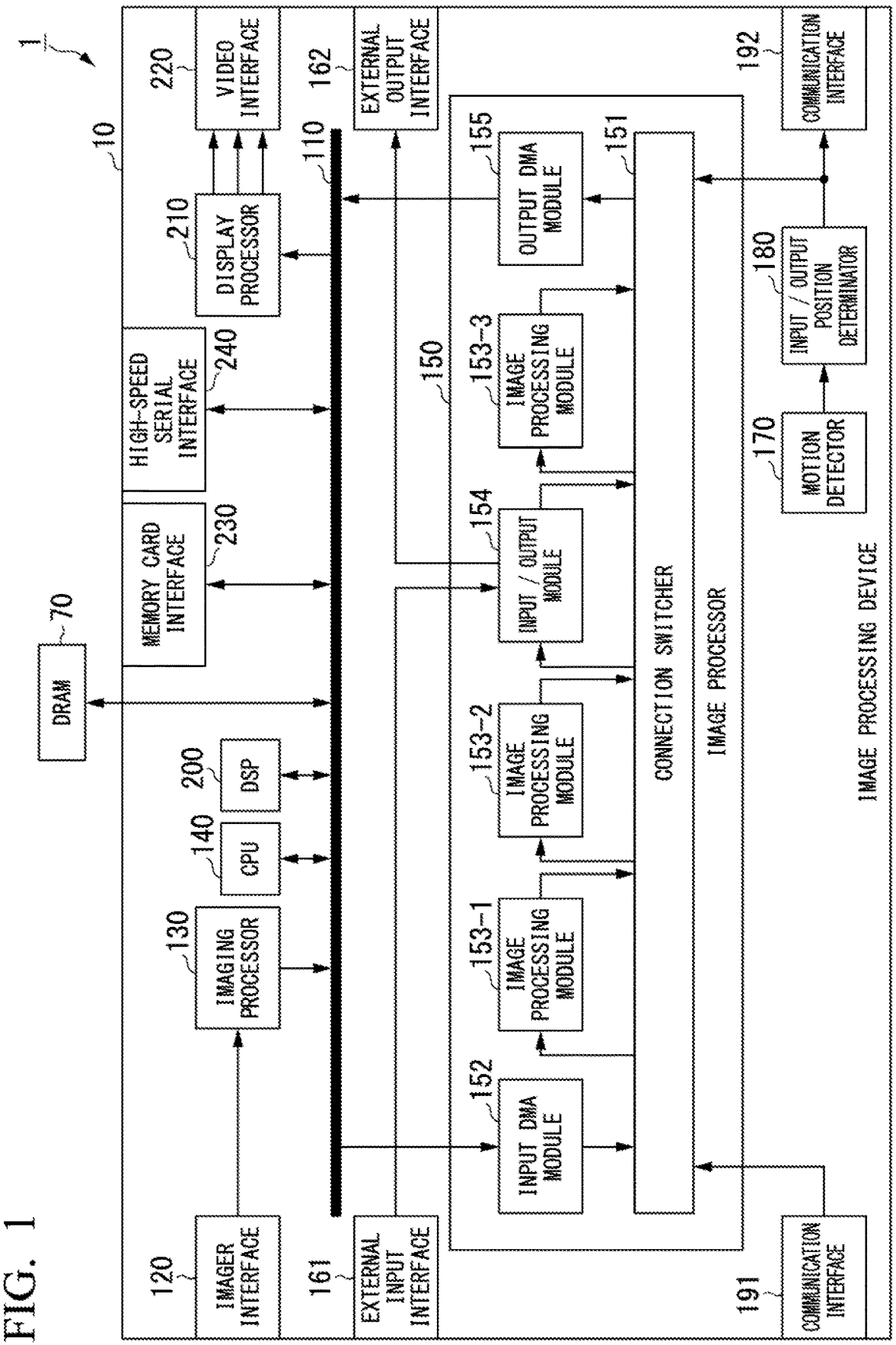
FIG. 1 is a block diagram showing a schematic configuration of an imaging device provided with an image processing device according to an embodiment of the present invention.

Hereinafter, embodiments of the present invention will be described with reference to the drawings. In the following description, for example, a case where an image processing device according to an embodiment of the present invention is mounted on an imaging device such as a still image camera (hereinafter, referred to as "imaging device 1") will be described. FIG. 1 is a block diagram showing a schematic configuration of an imaging device provided with an image processing device according to an embodiment of the present invention.

The image processing device 10 shown in FIG. 1 includes a DMA (Direct Memory Access) bus 110, an imager interface (I/F) unit 120, an imaging processing unit 130, a CPU (Central Processing Unit) 140, an image processing unit 150, an external input interface (I/F) unit 161, an external output interface (I/F) unit 162, an operation detection unit 170, an input/output position determination unit 180, a communication interface (I/F) unit 191, a communication interface (I/F) unit 192, a digital signal processor (DSP) 200, a display processing unit 210, a video interface (I/F) unit 220, a memory card interface (I/F) unit 230, and a high-speed serial interface (I/F) unit 240. The image processing unit 150 includes a connection switching unit 151, an input DMA module 152, three image processing modules 153-1 to 153-3, an input/output module 154, and an output DMA module 155.

In FIG. 1, only the DRAM 70 is shown as a component in the imaging device 1 related to the image processing device 10 according to the embodiment of the present invention, and illustration of other components provided in the imaging device 1 is omitted. Other components included in the imaging device 1 are, for example, a solid-state imaging device (hereinafter, also referred to as an "imager") that photoelectrically converts an optical image of an object, a lens that forms an optical image of an object on an imager, a recording medium such as a memory card for recording data of an image subjected to image processing by the image processing device 10, and a display device for displaying an image subjected to image processing by the image processing device 10. Here, the other components included in the imaging device 1 described above may be configured to be removable from the imaging device 1. In addition, as another component included in the imaging device 1, for example, a system control device for controlling the image processing device 10 or the other components described above may be included.

The DRAM 70 is a data storage unit connected to the DMA bus 110 in the image processing device 10 and storing various data processed in the imaging device 1. For example, the DRAM 70 stores still image data output from an imager (not shown) provided in the imaging device 1.

In the image processing device 10, image processing is performed on the still image data stored in the DRAM 70. When the image processing device 10 performs image processing on still image data stored in the DRAM 70, the image processing device 10 may perform image processing on each still image of one frame, that is, on the entire still image of one frame. Alternatively, one frame of still image data stored in the DRAM 70 may be divided into a plurality of predetermined small blocks, and image processing may be performed for each block. However, in the following description, in order to facilitate the description, the image processing device 10 does not distinguish the image processing method, and performs image processing on still image data (hereinafter simply referred to as "image data") of one frame stored in the DRAM 70.

The DMA bus 110 is a data bus for the connected components to access the DRAM 70 by DMA.

The CPU 140 is a control unit that controls the entire image processing device 10 by controlling the respective components provided in the image processing device 10. The CPU 140 controls the entire image processing device 10 in accordance with a program or data for controlling each component. The program and data for the CPU 140 to control the entire image processing device 10 may be stored in the DRAM 70 connected to the DMA bus 110. In this case, the CPU 140 controls the entire image processing device 10 by reading and executing programs and data stored in the DRAM 70.

The imager interface unit 120 is an interface unit with an imager (not shown) provided in the imaging device 1. The imager interface unit 120 receives signals of respective pixels (hereinafter referred to as "pixel signals") representing an optical image of an object output from an imager (not shown) according to settings from the CPU 140, and outputs (transmits) the received pixel signals to the imaging processing unit 130.

When the imager (not shown) outputs analog pixel signals, the imager interface unit 120 may include an A/D (analogue/digital) converter that converts the analog pixel signal output from the imager (not shown) into a digital pixel signal, and output the digital signal (hereinafter referred to as "pixel data") to the imaging processing unit 130. When the imager (not shown) outputs digital pixel signals (pixel data), the imager interface unit 120 may receive a pixel signal (pixel data) output from an imager (not shown), for example, by a transmission method according to LDVS (Low Voltage Differential Signaling) method that is a differential interface method, which is often used in a solid-state imaging device (imager). The transmission method for the imager interface unit 120 to receive the pixel signal (pixel data) output from the imager (not shown) is not limited to the above-described transmission method.

The imaging processing unit 130 performs various processes on the pixel data output from the imager interface unit 120 according to the setting from the CPU 140. Examples of processing that the imaging processing unit 130 applies to pixel data include a pre-processing such as a shading correction that corrects the brightness of the entire image represented by the pixel data, a black level correction that corrects the fluctuation of the black level of the entire image, and a pixel defect correction for replacing pixel data corresponding to a defective pixel included in an imager (not shown). The imaging processing unit 130 writes (stores) the image data including the preprocessed pixel data in the DRAM 70 by DMA via the DMA bus 110.

Note that the imaging processing unit 130 may be provided with a function of AE/AF detection processing for generating an evaluation value for controlling photographing of a subject in the imaging device 1 according to preprocessed pixel data and image data, such as auto exposure (AE), auto focus (AF), and auto white balance (AWB). In this case, the imaging processing unit 130 writes (stores) the data of the evaluation value generated by the AE/AF detection processing in the DRAM 70 by the DMA via the DMA bus 110 as data obtained by detecting the AE/AF.

The image processing unit 150 performs various predetermined image processing on the input image data. The image processing unit 150 is a pipeline processing unit configured to perform a series of image processing predetermined by the image processing device 10. More specifically, the image processing unit 150 performs sequentially a series of image processing predetermined by the image processing device 10, using pipeline processing in which the input DMA module 152, the image processing modules 153-1 to 153-3, and the output DMA module 155 are connected in series. In the following description, the image processing modules 153-1 to 153-3 are referred to as "image processing module 153" when they are referred to without distinction.

Further, the image processing unit 150 has a function of selecting image processing included in the pipeline processing, and a function of changing the order of image processing to be performed by the pipeline processing. That is, the image processing unit 150 has a function of changing the configuration of the pipeline. For example, the image processing unit 150 can configure a pipeline that sequentially performs image processing by each of the image processing modules 153-1 to 153-3. Also, for example, the image processing unit 150 can configure a pipeline for performing image processing by changing the order of the image processing modules 153-1 to 153-3. Also, for example, the image processing unit 150 can configure a pipeline that performs image processing by one or more of the image processing modules 153-1 to 153-3. The configuration of the pipeline in the image processing unit 150 is changed (set) by an input/output position determination unit 180 described later. The configuration of the pipeline in the image processing unit 150 can also be changed (set) from the outside of the image processing device 10 (for example, a system control device or the like) via the communication interface unit 191 described later.

The image processing unit 150 also has a function of performing image processing on image data input from the outside of the image processing device 10 by each of the image processing modules 153-1 to 153-3. Further, the image processing unit 150 has a function of outputting the image data subjected to the image processing by each of the image processing modules 153-1 to 153-3 to the outside of the image processing device 10. In other words, the image processing unit 150 has a function of directly inputting image data from and outputting image data to another image processing device or the like provided outside the image processing device 10 as another component of the imaging device 1. By the function of directly inputting the image data from and outputting the image data to the outside of the image processing device 10, in the image processing unit 150, image processing different from the image processing applied by each of the image data processing modules 153-1 to 153-3 provided outside the image processing device 10 can be incorporated into the pipeline processing. That is, the image processing unit 150 can incorporate image processing, which is not performed in any of the image processing modules 153 of the image processing modules 153-1 to 153-3, into the pipeline processing.

At this time, when another image processing device provided outside the image processing device 10 in the imaging device 1 is used as the image processing device 10 having the same configuration, that is, the imaging device 1 is provided with a plurality of image processing devices 10, a series of image processing in the pipeline processing can be performed, shared by the image processing unit 150 provided in each of the plurality of image processing devices 10, using the function of directly inputting image data from and outputting image data to outside the image processing device 10. For example, when the imaging device 1 has a configuration including two image processing devices 10, the image processing unit 150 provided in each of the two image processing devices 10 shares the pipeline processing to be performed as a series of image processing.

In the image processing unit 150, a function of directly inputting image data from and outputting image data to the outside of the image processing device 10, a function of incorporating different image processing into the pipeline processing, and sharing the pipeline processing with a plurality of image processing devices 10 are realized by incorporating an input/output module 154 described later into the pipeline configuration of the image processing modules 153-1 to 153-3.

As described above, the configuration of the pipeline in the image processing unit 150 is changed (set) by the setting from the input/output position determination unit 180 described later, or control from the outside of the image processing device 10 input via the communication interface unit 191 described later. Therefore, in the image processing unit 150, setting as to whether or not the input/output module 154 is to be incorporated into the pipeline, setting of a position to incorporate the input/output module 154 into the pipeline, and the like are set together with the setting of the above-described function for changing the configuration of the pipeline by setting from an input/output position determination unit 180 described later or control from the outside (for example, a system control device or the like) of the image processing device 10 inputted via the communication interface unit 191 described later.

Note that in the imaging device 1 including the plurality of image processing devices 10 and configured to share the above-described pipeline processing with the image processing units 150 provided in each of the plurality of image processing devices 10, the input/output position determination unit 180 described later included in any one image processing device 10 changes (sets) the pipeline configuration in each of the image processing units 150 together with the setting of the above-described function for changing the configuration of the pipeline. However, even in the imaging device 1 including the plurality of image processing devices 10, the pipeline configuration in each image processing unit 150 may be changed (set) from the outside of each of the image processing devices 10 (for example, a system control device or the like) via each communication interface unit 191 described later.

In the image processing device 10 shown in FIG. 1, it is assumed that the input/output module 154 is incorporated at the position between the image processing module 153-2 and the image processing module 153-3 in the image processing unit 150. However, as described above, the position where the input/output module 154 is incorporated in the pipeline in the image processing unit 150 is changed (set) by the setting from the input/output position determination unit 180 described later or by control from the outside of the image processing device 10 input via the communication interface unit 191 described later. Therefore, the position where the input/output module 154 is incorporated in the pipeline in the image processing unit 150 is not limited to the position shown in FIG. 1, and it may be incorporated in any position in the pipeline configuration in the image processing unit 150. That is, in the image processing unit 150, the input/output module 154 can be incorporated at any position such as the top, middle, or tail of the pipeline.

The connection switching unit 151 switches the output destination of the image data output by the processing module provided in the image processing unit 150 according to the setting from the input/output position determination unit 180 described later or the control from the outside of the image processing device 10 input via the communication interface unit 191 described later. That is, the connection switching unit 151 switches the connection between the processing modules provided in the image processing unit 150. More specifically, the connection switching unit 151 switches the output destination of the image data output from each of the input DMA module 152, the image processing modules 153-1 to 153-3, the input/output module 154, and the output DMA module 155 provided in the processing unit 150, according to the setting from the input/output position determination unit 180 described later or the control from the outside of the image processing device 10 input via the communication interface unit 191 described later. Thereby, in the image processing unit 150, functions of changing the configuration of the pipeline are realized, such as a function of selecting the image processing included in the pipeline processing, a function of changing the order of the image processing to be performed by the pipeline processing, and a function of directly inputting image data from and outputting image data to the outside of the image processing device 10 (a function of incorporating different image processing into pipeline processing, or a function of sharing pipeline processing).

For example, it is assumed that the image processing unit 150 performs image processing of only the image processing module 153-2. In this case, the connection switching unit 151 switches the connection of each component to connect the output terminal of the input DMA module 152 and the input terminal of the image processing module 153-2, and to connect the output terminal of the image processing module 153-2 and the input terminal of the output DMA module 155. Further, for example, it is assumed that the image processing unit 150 performs image processing in the order of the image processing module 153-3 and the image processing module 153-1. In this case, the connection switching unit 151 switches the connection of each component to connect the output terminal of the input DMA module 152 and the input terminal of the image processing module 153-3, to connect the output terminal of the image processing module 153-3 and the input terminal of the image processing module 153-1, and to connect the output terminal of the image processing module 153-1 and the input terminal of the output DMA module 155. Further, for example, it is assumed that the image processing unit 150 performs image processing outside the image processing device 10 subsequently to the image processing module 153-2. In this case, the connection switching unit 151 switches the connection of each component to connect the output terminal of the input DMA module 152 and the input terminal of the image processing module 153-2, to connect the output terminal of the image processing module 153-2 and the input terminal of the input/output module 154, and to connect the output terminals of the input/output module 154 and the input terminals of the output DMA module 155.

Also, for example, it is assumed that, in the imaging device 1 including two image processing devices 10, the image processing unit 150 included in one image processing device 10 performs image processing of only the image processing module 153-2, and the image processing unit 150 provided in the other image processing device 10 performs image processing of only the image processing module 153-3. In this case, the connection switching unit 151 provided in one image processing device 10 switches the connection of each component to connect the output terminal of the input DMA module 152 and the input terminal of the image processing module 153-2, and to connect the output terminal of the image processing module 153-2 and the input terminal of the input/output module 154. Also, the connection switching unit 151 provided in the other image processing device 10 switches the connection of each component to connect the output terminal of the input/output module 154 to the input terminal of the image processing module 153-3, and to connect the output terminal of the image processing module 153-3 and the input terminal of the output DMA module 155.

In the image processing unit 150, as described above, the input/output module 154 can be incorporated at any position such as the top, middle, or tail of the pipeline. For example, it is assumed that the image processing unit 150 performs the image processing of the image processing module 153-1 following the image processing outside the image processing device 10, that is, the input/output module 154 is incorporated at the beginning of the pipeline. In this case, the connection switching unit 151 switches the connection of each component to connect the output terminal of the input DMA module 152 and the input terminal of the input/output module 154, to connect the output terminal of the input/output module 154 and the input terminal of the image processing module 153-1, and to connect the output terminal of the image processing module 153-1 and the input terminal of the output DMA module 155. Further, for example, it is assumed that the image processing unit 150 performs the image processing in the order of the image processing module 153-2, the image processing outside the image processing device 10, and the image processing module 153-3, that is, the input/output module 154 is incorporated in the middle of a pipeline. In this case, the connection switching unit 151 switches the connection of each component to connect the output terminal of the input DMA module 152 and the input terminal of the image processing module 153-2, to connect the output terminal of the image processing module 153-2 and the input terminal of the input/output module 154, to connect the output terminal of the input/output module 154 and the input terminal of the image processing module 153-3, and to connect the output terminal of the image processing module 153-3 and the input terminal of the output DMA module 155. Further, for example, it is assumed that the image processing unit 150 performs image processing outside the image processing device 10 following the image processing module 153-3, that is, the input/output module 154 is incorporated at the end of the pipeline. In this case, the connection switching unit 151 switches the connection of each component to connect the output terminal of the input DMA module 152 and the input terminal of the image processing module 153-3, to connect the output terminal of the image processing module 153-3 and the input terminal of the input/output module 154, and to connect the output terminals of the input/output module 154 and the input terminals of the output DMA module 155.

Note that image processing outside the image processing device 10 may be considered as image processing (pipeline processing) performed by the image processing unit 150 provided in another image processing device 10 in the imaging device 1 provided with a plurality of image processing devices 10. For example, in the imaging device 1 including two image processing devices 10, a configuration may be adopted in which the image processing unit 150 included in one of the image processing devices 10 performs the image processing of the image processing module 153-1, the image processing unit 150 included in the other image processing device 10 performs the image processing of only the image processing module 153-2, and the image processing unit 150 included in the one of the image processing devices 10 performs the image processing of the image processing module 153-3. In this case, the connection switching unit 151 provided in one image processing device 10 switches the connection of each component to connect the output terminal of the input DMA module 152 and the input terminal of the image processing module 153-1, and to connect the output terminal of the image processing module 153-1 and the input terminal of the input/output module 154. Further, the connection switching unit 151 provided in one image processing device 10 switches the connection of each component to connect the output terminal of the input/output module 154 and the input terminal of the image processing module 153-3, and to connect the output terminal of the image processing module 153-3 and the input terminal of the output DMA module 155. Further, the connection switching unit 151 provided in the other image processing device 10 switches the connection of each component to connect the output terminal of the input/output module 154 and the input terminal of the image processing module 153-2, and to connect the output terminal of the image processing module 153-2 and the input terminal of the input/output module 154.

The image processing unit 150 may incorporate only the input/output module 154 into the pipeline. That is, the image processing unit 150 may output the image data stored in the DRAM 70 to the outside, and store the image data input from the outside in the DRAM 70. More specifically, the connection switching unit 151 switches the connection of each component to connect the output terminal of the input DMA module 152 and the input terminal of the input/output module 154, and to connect the output terminal of the input/output module 154 and the input terminal of the output DMA module 155. Accordingly, the image processing unit 150 can perform only the input/output module 154, that is, only the image processing by the outside of the image processing device 10 as pipeline processing.

Further, for example, it is assumed that, in the imaging device 1 provided with two image processing devices 10, the image processing unit 150 provided in one image processing device 10 does not perform image processing, that is, only transmits image data from one image processing device 10 to the other image processing device 10, and image processing is performed by the image processing unit 150 provided in the other image processing device 10. In this case, the connection switching unit 151 provided in the one image processing device 10 switches the connection of each component to connect the output terminal of the input DMA module 152 and the input terminal of the input/output module 154. Also, the connection switching unit 151 provided in the other image processing device 10 switches the connection of each component to connect the output terminal of the input/output module 154 and the input terminal of the image processing module 153 that performs image processing, and to connect the output terminal of the image processing module 153 that performs image processing and the input terminal of the output DMA module 155. When the image processing unit 150 included in the other image processing device 10 does not perform image processing, the connection switching unit 151 included in the other image processing device 10 may switch the connection of each component to connect the output terminal of the input/output module 154 and the input terminal of the output DMA module 155. In this case, the image data is transmitted from the DRAM 70 connected to one image processing device 10 to the DRAM 70 connected to the other image processing device 10.

The input DMA module 152 is a processing module for reading the image data stored in the DRAM 70 by DMA and outputting the read image data to a processing module, which is the connection destination whose connection is switched by the connection switching unit 151 as a processing module that performs image processing next. More specifically, the input DMA module 152 reads the image data stored in the DRAM 70 by DMA via the DMA bus 110 according to the setting from the CPU 140. Then, the input DMA module 152 outputs the read image data to any of the image processing module 153 and the input/output module 154 connected as a processing module that performs image processing next via the connection switching unit 151.

The input DMA module 152 may be configured to include a data buffer capable of temporarily storing a predetermined number of pixel data (pixel data subjected to preprocessing) included in image data. In this configuration, the input DMA module 152 temporarily stores each of a predetermined number of pixel data included in the image data read from the DRAM 70 via the DMA bus 110 in the data buffer. Then, the input DMA module 152 outputs the respective pixel data temporarily stored in the data buffer to one of the image processing module 153 and the input/output module 154, which is the connection destination whose connection is switched by the connection switching unit 151, as the respective pixel data included in the image data read from the DRAM 70.

Each of the image processing modules 153-1 to 153-3 is a processing module for performing various predetermined digital image processing on image data input via the connection switching unit 151. More specifically, image data to be subjected to image processing is input from any of the input DMA module 152, the other image processing modules 153 and the input/output module 154, which is the connection destination whose connection is switched by the connection switching unit 151 as a processing module that has been subjected to image processing previously, to each of the image processing modules 153-1 to 153-3 via the connection switching unit 151. Each of the image processing modules 153-1 to 153-3 performs predetermined image processing on the image data input via the connection switching unit 151 according to the setting from the CPU 140. There are various types of image processing as image processing to be performed on the input image data by each of the image processing modules 153-1 to 153-3. The image processing performed by the image processing module 153 includes, for example, YC processing for generating Y (luminance) signals and C (color) signals corresponding to respective pixel data included in the image data, noise reduction processing to reduce noise included in each pixel data, LPF processing to suppress high frequency components in the image represented by each pixel data, edge enhancement processing to emphasize the outline of the subject included in the image represented by each pixel data, and the like. Further, the image processing performed by the image processing module 153 includes, for example, image processing for generating an image according to the input image data, that is, an image for displaying an image captured by the imaging device 1 on a display device (not shown), image processing for generating an image for recording an image captured by the imaging device 1 on a recording medium (not shown), processing for transmitting input image data to another device, and the like. Each of the image processing modules 153-1 to 153-3 outputs image data obtained by performing the above-described image processing on image data input via the connection switching unit 151, to any of the other image processing module 153, the input/output module 154, and the output DMA module 155, which is the connection destination whose connection has been switched by the connection switching unit 151.

Each of the image processing modules 153-1 to 153-3 may also be configured to include a data buffer capable of temporarily storing a predetermined number of pixel data included in image data. In the case of this configuration, each of the image processing modules 153-1 to 153-3 temporarily stores in a data buffer for each of a predetermined number of pixel data included in image data input via the connection switching unit 151. Then, each of the image processing modules 153-1 to 153-3 performs image processing on each pixel data temporarily stored in the data buffer. Thereafter, each of the image processing modules 153-1 to 153-3 outputs each pixel data subjected to the image processing as each pixel data included in the image data, to one of the other image processing module 153, the input/output module 154, or the output DMA module 155, which is the connection destination whose connection is switched by the connection switching unit 151. Note that each of the image processing modules 153-1 to 153-3 performs image processing on the image data input via the connection switching unit 151, and temporarily stores the image data in the data buffer. The temporarily stored image data may be output to the connection destination whose connection has been switched by the connection switching unit 151.

In the image processing device 10 shown in FIG. 1, the configuration of the image processing unit 150 including the three image processing modules 153 of the image processing modules 153-1 to 153-3 is shown. But the number of image processing modules 153 provided in the processing unit 150 is not limited to three as shown in FIG. 1. That is, the image processing unit 150 may be configured to include more image processing modules 153.

In the following description, the image data subjected to the image processing by one of the image processing modules 153 is referred to as "processed image data" when distinguished from the image data to be subjected to the image processing stored in the DRAM 70.

The input/output module 154 is an interface module that directly inputs image data from the outside of the image processing device 10 to the image processing unit 150 and directly outputs the image data subjected to image processing by the image processing unit 150 to the outside of the image processing device 10. In other words, the input/output module 154 is an interface module for incorporating image processing (hereinafter referred to as "external image processing") performed in an image processing device (hereinafter referred to as "external image processing device") outside the image processing device 10, such as another image processing device (may be the other image processing device 10) provided as another component in the imaging device 1, into pipeline processing in the image processing unit 150. Further, the input/output module 154 is an interface module for dividing pipeline processing into the image processing units 150 included in the respective image processing devices 10 when the imaging device 1 has a configuration including a plurality of image processing devices 10. More specifically, the input/output module 154 receives the image data that the connected external input interface unit 161 receives from the external image processing device or another image processing device 10 according to the setting from the CPU 140, to output directly to either the image processing module 153 or the output DMA module 155, which is the connection destination whose connection has been switched by the connection switching unit 151, without passing through the DMA bus 110. In addition, the input/output module 154 receives the image data from either the input DMA module 152 or the image processing module 153, which is the connection destination whose connection is switched by the connection switching unit 151, according to the setting from the CPU 140, via the connection switching unit 151, and outputs the input image data directly to the connected external output interface unit 162, without passing through the DMA bus 110, thereby outputting to the external image processing device or another image processing device 10.

The input/output module 154 may also include a buffer that temporarily stores a predetermined number of pixel data included in image data directly input from an external image processing device or output directly to an external image processing device. In this configuration, the input/output module 154 temporarily stores each of a predetermined number of pixel data included in the image data that the external input interface unit 161 receives and outputs from the external image processing device in the data buffer. Then, the input/output module 154 sets each pixel data temporarily stored in the data buffer as each pixel data included in the image data directly input from the external image processing device to output to either the image processing module 153 or the output DMA module 155, which is the connection destination whose connection is switched by the connection switching unit 151. Further, the input/output module 154 temporarily stores each of a predetermined number of pixel data included in image data input via the connection switching unit 151 in a data buffer from either the input DMA module 152 or the image processing module 153, which are the connection destination whose connection has been switched by the connection switching unit 151. Then, the input/output module 154 outputs the respective pixel data temporarily stored in the data buffer to the connected external output interface unit 162 as the respective pixel data included in the image data to be directly output to the external image processing device.

In the image processing device 10 shown in FIG. 1, the configuration of the image processing unit 150 provided with one input/output module 154 is shown, but the number of input/output modules 154 provided in the image processing unit 150 is not limited to one as shown in FIG. 1. That is, the image processing unit 150 may have a configuration including more input/output modules 154, to be capable of incorporating a plurality of external image processing into the pipeline processing in the image processing unit 150, or sharing the pipeline processing in the image processing unit 150 by a plurality of the image processing device 10.

In the following description, image data directly input to the image processing device 10 (that is, the image processing unit 150) from the external image processing device by the input/output module 154 is referred to as "externally processed image data" when it is distinguished from the target image data subjected to the image processing stored in the DRAM 70 or the image data (processed image data) subjected to the image processing by any of the image processing modules 153.

The output DMA module 155 DMA is a processing module for storing the image data in the DRAM 70 by DMA output from any of the processing modules whose connection destination is switched by the connection switching unit 151 as the last processed image processing module. More specifically, the output DMA module 155 receives processed image data after image processing is performed by the image processing module 153, which is the connection destination whose connection is switched by the connection switching unit 151, or externally processed image data directly input from the external image processing device to the input/output module 154 via the connection switching unit 151. The output DMA module 155 outputs and writes (stores) the processed image data or externally processed image data input via the connection switching unit 151 to the DRAM 70 by DMA via the DMA bus 110 according to the setting from the CPU 140.

The output DMA module 155 may also be configured to include a data buffer capable of temporarily storing a predetermined number of pixel data included in the processed image data or the externally processed image data. In this configuration, the output DMA module 155 temporarily stores, in the data buffer, each of the predetermined number of pixel data included in the processed image data or externally processed image data input via the connection switching unit 151. Then, the output DMA module 155 outputs each pixel data temporarily stored in the data buffer to the DRAM 70 via the DMA bus 110 as the processed image data written (stored) in the DRAM 70 or the respective pixel data included in the externally processed image data.

In the following description, when the processed image data output from each of the image processing modules 153 and the externally processed image data output from the input/output module 154 are represented without distinction, they are simply referred to as "processed image data".

Each of the external input interface unit 161 and the external output interface unit 162 is an interface unit with an external image processing device (may be another image processing device 10) provided outside and connected to the image processing device 10 in the imaging device 1. Note that the external image processing device connected to the external input interface unit 161 and the external image processing device connected to the external output interface unit 162 may be the same external image processing device, or may be different external image processing devices.

The external input interface unit 161 receives externally processed image data output from the connected external image processing device, and outputs (transmits) the received externally processed image data directly to the input/output module 154 provided in the image processing unit 150 without passing through the DMA bus 110. Also, the external output interface unit 162 directly outputs (transmits) the processed image data output from the input/output module 154 provided in the image processing unit 150 to the connected external image processing device without passing through the DMA bus 110.

As the transmission method of processed image data in the external input interface unit 161 and the external output interface unit 162 with the external image processing device, various existing specifications and methods used for data transmission among a plurality of system LSIs can be used.

For example, as the transmission method for transmitting processed image data with the external image processing device in the external input interface unit 161 and the external output interface unit 162, a transmission method conforming to various predetermined high-speed serial bus specifications such as PCI-Express (Peripheral Component Interconnect-Express) or USB (Universal Serial Bus) may be used. Further, in the external input interface unit 161 and the external output interface unit 162, as a transmission method for transmitting processed image data with the external image processing device, a transmission method in accordance with the AXI (Advanced eXtensible Interface) specification may be used. In the external input interface unit 161 and the external output interface unit 162, the specification and transmission method for transmitting processed image data with the external image processing device are not limited to the above specifications and transmission method. Each of the external input interface unit 161 and the external output interface unit 162 corresponds to a plurality of specifications and transmission methods used for data transmission among a plurality of system LSIs, and may have a configuration to change the specification and transmission method used when transmitting processed image data to and from the external image processing device according to the specification and transmission method used by the connected external image processing device. Therefore, in the present invention, the specification and transmission method in the external input interface unit 161 and the external output interface unit 162 for transmitting processed image data with the external image processing device are not particularly defined.

Note that each of the external input interface unit 161 and the external output interface unit 162 may have a function of matching the format of processed image data handled by the input/output module 154 with the format of image data handled by the external image processing device, that is, the format of processed image data to be exchanged with the external image processing device when the processed image data is exchanged with the external image processing device. For example, the external input interface unit 161 may have a function of converting the externally processed image data output in a format handled by the external image processing device, when receiving the externally processed image data from the external image processing device, into a format handled by the input/output module 154, that is, a format for the image processing module 153 to continue image processing or a format for the connection switching unit 151 to output to the DRAM 70, to be output to the input/output module 154. Also, for example, the external output interface unit 162 may have a function of converting the format of the processed image data output from the input/output module 154, when outputting (transmitting) processed image data to the external image processing device, into a format handled in the external image processing device, to be output (transmit) to the external image processing device.

Note that each of the external input interface unit 161 and the external output interface unit 162 is not limited to a configuration provided exclusively for transmitting externally processed image data to and from the external image processing device. That is, the present invention is not limited to the configuration in which the external input interface unit 161 is exclusively provided for receiving the externally processed image data output from the connected external image processing device, and the external output interface unit 162 is exclusively provided for outputting (transmitting) the processed image data to the connected external image processing device. For example, the external input interface unit 161 may be configured together with the imager interface unit 120 that is configured to receive pixel signals output from an imager (not shown) according to the LVDS method, by configuring it to use the transmission method according to the LVDS method as the transmission method of the externally processed image data with the external image processing device. Also, for example, as a transmission method of the externally processed image data with the external image processing device, the external output interface unit 162 may be configured together with the video interface unit 220, by configuring it to use a transmission method according to the same transmission method as the data transmission method used when the video interface unit 220 described later outputs image data to be displayed on a display device (not shown) or the like. Therefore, in the present invention, the respective configurations of the external input interface unit 161 and the external output interface unit 162 are not particularly defined.

The digital signal processor 200 is a signal processing unit that performs various predetermined digital signal processing (image processing) on image data (including processed image data and externally processed image data) stored in the DRAM 70. More specifically, the digital signal processor 200 reads image data stored in the DRAM 70 by DMA via the DMA bus 110 according to settings from the CPU 140, for example. Then, the digital signal processor 200 performs image processing on the read image data. Here, the image processing performed by the digital signal processor 200 is image processing (hereinafter referred to as "DSP image processing") that is not performed by any of the image processing modules 153-1 to 153-3 included in the image processing unit 150. That is, the digital signal processor 200 performs DSP image processing different from the series of image processing performed by the image processing unit 150 on the read image data. For example, the digital signal processor 200 performs, as DSP image processing, processing using a learning function such as image recognition for detecting a movement or a face of a subject included in an image represented by image data. The digital signal processor 200 also performs, for example, image interpolation processing involving conversion of the position (coordinates) of the pixel corresponding to each pixel data included in the image data as DSP image processing. The image interpolation processing that the digital signal processor 200 performs as DSP image processing includes various processes such as resizing processing to change (enlarge or reduce) the size of the image, distortion correction processing to correct distortion such as magnification chromatic aberration and distortion included in the image, shape correction processing to correct the shape of the image such as trapezoidal correction, and the like. The digital signal processor 200 again writes (stores) the image data after DSP image processing to the DRAM 70 by DMA via the DMA bus 110.

In the following description, image data after DSP image processing is referred to as "DSP-processed image data", in the case of being distinguished from image data to be subjected to image processing stored in the DRAM 70, processed image data after image processing has been performed by one of the image processing modules 153, and externally processed image data directly input via the input/output module 154 by the external image processing device performing external image processing. Further, in the following description, processed image data after image processing has been performed by one of the image processing modules 153, externally processed image data directly input from the external image processing device via the input/output module 154, and DSP-processed image data subjected to DSP image processing by the digital signal processor 200 are simply referred to as "processed image data".

The display processing unit 210 performs predetermined display processing on the display image data stored in the DRAM 70 according to the setting from the CPU 140, and generates a display image for displaying an image corresponding to display image data on a display device (not shown). That is, the display processing unit 210 performs a predetermined display processing on the image data of the image to be displayed on the display device (not shown) and generated by the image processing unit 150 and stored in the DRAM 70, and generates a display image for displaying an image captured by the imaging device 1 on a display device (not shown) such as a liquid crystal display (LCD), for example. The display processing to be performed on the image data when the display processing unit 210 generates a display image includes, for example, an OSD superimposing process of superimposing an on screen display (OSD) image for displaying various information related to a photographed still image such as photographing date and time by the imaging device 1. The display processing unit 210 outputs data of the generated display image (hereinafter referred to as "display image data") to the video interface unit 220, and causes the display device (not shown) to display the display image.

In addition, as a display device not shown with which the imaging device 1 is equipped, the display device on which the image of various sizes (resolution) is displayed can be considered. For example, as a display device (not shown), there is a small display device mounted on the imaging device 1 and displaying a relatively low resolution image, such as an EVF (Electronic View Finder) for confirming an object to be photographed in the imaging device 1, a TFT (thin film transistor) liquid crystal display that operates as a viewfinder for confirming an object to be photographed, and the like. Also, for example, as a display device (not shown), there is also a medium-sized display device that has a configuration that can be attached to and detached from the imaging device 1 and that displays an image of medium resolution, such as a TFT liquid crystal display that displays an image having a resolution of XGA size (1024×768). Further, for example, as a display device (not shown) configured to be attachable to and detachable from the imaging device 1, there are also large display devices that display high resolution images, such as an image having resolution of full HD size (1920×1080) compatible with HDTV (High Definition TeleVision), an image having resolution of 4K size (3840×2160) compatible with LHDTV (Ultra High Definition TeleVision), and the like. Further, for example, as a display device (not shown) configured to be attachable to and detachable from the imaging device 1, a larger display device which displays an image having a resolution of 8K size (7680×4320), which is further refined to 4K size, is also conceivable. Therefore, the display processing unit 210 generates a display image according to the size (resolution) of an image that can be displayed by a display device (not shown) provided in the imaging device 1 and outputs the generated display image to the video interface unit 220. Therefore, in the present invention, the display processing to be performed on the image data for display when the display processing unit 210 generates a display image is not particularly defined.

The video interface unit 220 is an interface unit with a display device (not shown) provided in the imaging device 1. The video interface unit 220 outputs (transmits) the display image data output from the display processing unit 210 to a display device (not shown) according to the setting from the CPU 140, and displays an image according to the display image data.

The video interface unit 220 may be configured, for example, to output (transmit) display image data according to the MIPI method to a display device (not shown) by a transmission method conforming to the MIPI (Mobile Industry Processor Interface) method, which is a differential interface method adopted in display devices. The transmission method for the video interface unit 220 to output (transmit) display image data to a display device (not shown) is not limited to the above-described transmission method.

The memory card interface unit 230 is an interface unit with a recording medium (not shown) provided in the imaging device 1. The memory card interface unit 230 outputs (transmits) image data for recording (hereinafter referred to as "recorded image data"), which is generated by the image processing unit 150 according to settings from the CPU 140 and stored in the DRAM 70, to a recording medium (not shown) and causes the recording medium to record the data. Note that the transmission method when the memory card interface unit 230 causes the recording medium (not shown) to record the recorded image data is a transmission method adopted for the recording medium (not shown).

The high-speed serial interface unit 240 is an interface unit for transmitting image data stored in the DRAM 70 at high speed to another device (not shown). The high-speed serial interface unit 240 outputs (transmits) the image data (including processed image data, externally processed image data, DSP-processed image data) and the recorded image data (which may include display image data) stored in the DRAM 70 to another device (not shown) according to the setting from the CPU 140. As another device to which the high-speed serial interface unit 240 transmits the image data and the recorded image data stored in the DRAM 70 at high speed, for example, an external storage device (so-called storage devices) for storing the image data and recorded image data can be considered. Also, as another device to which the high-speed serial interface unit 240 transmits the image data and the recorded image data stored in the DRAM 70 at high speed, for example, a communication device that performs wireless communication or wired communication with a storage device, a server device, or the like in a cloud computing system for storing image data and recorded image data on the Internet is also conceivable. The transmission method used when the high-speed serial interface unit 240 outputs (transmits) image data and recorded image data to another device (not shown) is a transmission method employed in other devices (not shown).

The operation detection unit 170 detects an operation involving access to the DRAM 70 by each component provided in the image processing device 10. That is, the operation detection unit 170 detects an operation of processing using the bus band of the DMA bus 110 for each component included in the image processing device 10. More specifically, the operation detection unit 170 detects an operation related to imaging in the image processing device 10, an operation related to display in the image processing device 10, and an operation related to image processing in the image processing device 10. More specifically, the operation detection unit 170 detects the operation of the imager interface unit 120 and the imaging processing unit 130 related to the imaging operation in the image processing device 10, the operation of the display processing unit 210 and the video interface unit 220 related to the display operation in the image processing device 10, and the operation of the image processing unit 150 related to the operation of image processing in the image processing device 10.

At this time, as the operation related to imaging in the image processing device 10, the operation detection unit 170 detects a size (number of pixels in horizontal direction, number of pixels in vertical direction, and the like) of an imager (not shown), a frame rate, an output time required to complete output of a pixel signal (pixel data) for one frame after exposure for imaging ends, a bit length of a pixel signal (pixel data), and the like. These pieces of information can be obtained from setting values and the like set by the CPU 140 for each of the imager interface unit 120 and the imaging processing unit 130 related to the imaging operation in the image processing device 10.

Further, as the operation related to display in the image processing device 10, the operation detection unit 170 detects the resolution of an image (display image) displayed by a display device (not shown), frame rate, format of display image data, the number of on-screen display images to be superimposed, the number of channels for outputting display image data (such as the number of simultaneously outputting display image data), and the like. These pieces of information can be obtained from setting values and the like set by the CPU 140 for each of the display processing unit 210 and the video interface unit 220 related to the display operation in the image processing device 10.

Further, as the operation related to the image processing in the image processing device 10, the operation detection unit 170 detects the processing content of the image processing to be applied to the image data, the size of the image to be subjected to the image processing (such as the number of pixels of the image data, and the number of pixels of the processed image data), and the like. It is to be noted that these pieces of information can be obtained from setting values or the like of the image processing unit 150 related to the image processing operation in the image processing device 10, the input DMA module 152 provided in the image processing unit 150, the image processing modules 153-1 to 153-3, the input/output module 154, and the output DMA module 155. The operation detection unit 170 also detects the processing content of DSP image processing to be performed in the digital signal processor 200 as an operation related to image processing in the image processing device 10. This information can be obtained from the setting value or the like set by the CPU 140 with respect to the digital signal processor 200.

The operation detection unit 170 outputs, to the input/output position determination unit 180, information (hereinafter referred to as "operation information") of the operation in each component provided in the detected image processing device 10. That is, the operation detection unit 170 outputs, to the input/output position determination unit 180, information related to each operation of the imaging operation, the display operation, and the image processing operation in the image processing device 10.

The input/output position determination unit 180 determines the configuration of the pipeline in the image processing unit 150 according to the operation information output from the operation detection unit 170. More specifically, the input/output position determination unit 180 determines the type and order of image processing to be performed by pipeline processing configured in the image processing unit 150. Further, the input/output position determination unit 180 determines whether or not the external image processing device connected to the image processing device 10 is incorporated into the pipeline of the external image processing or the position to incorporate the external image processing into the pipeline, that is, determines whether or not the input/output module 154 is incorporated into the pipeline configured in the image processing unit 150, and the position to be incorporated. Further, the input/output position determination unit 180 determines the presence or absence of the sharing of the pipeline processing in the plurality of image processing devices 10 and the position where the pipeline processing is divided, that is, determines, in the pipeline configured in each image processing unit 150, whether or not the input/output module 154 is incorporated and the position to be incorporated.

At this time, the input/output position determination unit 180 determines the configuration of the pipeline in the image processing unit 150 so that the total bus bandwidth of the DMA bus 110 (hereinafter also referred to as "bus bandwidth of the DRAM 70") required for each component provided in the image processing device 10 to access the DRAM 70 is within the maximum bandwidth that the DRAM 70 can access. That is, the input/output position determination unit 180 changes the pipeline processing performed by the image processing unit 150, to prevent the series of image processing in the image processing unit 150 from squeezing the bus bandwidth of the DMA bus 110, so that the overall processing capacity (speed) of the imaging device 1 is not reduced.

When, for example, performing many image processes in the image processing unit 150, in a case in which all the image processes are configured as one pipeline, the bus bandwidth of the DRAM 70 is compressed, and the overall processing capacity (speed) of the imaging device 1 is reduced, in order to avoid compression of the bus band of the DRAM 70, the input/output position determination unit 180 may determine the configuration of the pipeline so that the pipeline processing to be performed in the image processing unit 150 is separately performed. At this time, the input/output position determination unit 180 may determine the configuration of the pipeline so that the bus bandwidth of the DRAM 70 in each of the divided pipeline processing becomes equal.

The input/output position determination unit 180 sets the determined configuration of the pipeline in the connection switching unit 151 provided in the image processing unit 150. Thereby, in the image processing device 10, the configuration of the pipeline can be set (changed) such that only a series of image processing performed in the image processing unit 150 among the image processing modules 153 included in the image processing unit 150 are connected in series.

Further, the input/output position determination unit 180 outputs the information on the determined configuration of the pipeline to the communication interface unit 192. Thus, for example, when the imaging device 1 is configured to include the plurality of image processing devices 10 having the same configuration, the configuration of the pipeline in the image processing unit 150 provided in each of the image processing devices 10 determined by the input/output position determination unit 180 can be set in the image processing unit 150 provided in the image processing device 10 in the subsequent stage. That is, since it is assumed that many image processes will be performed as the entire processing in the imaging device 1, by providing a plurality of (for example, two) image processing devices 10 from the beginning, the configuration of the pipeline determined by the input/output position determination unit 180 provide in the image processing device 10 in the previous stage can be set in the image processing unit 150 provided in each of the image processing devices 10 in the subsequent stage, in the imaging device 1 configured to share a series of image processing by each image processing device 10. At this time, the input/output position determination unit 180 may determine the configuration of the pipeline to set in the image processing unit 150 provided in each of the image processing devices 10 in the subsequent stage, so that the bus band of the DRAM 70 required when the image processing device 10 in the previous stage performs image processing is equal to the bus band of the DRAM 70 required when the image processing device 10 in the subsequent stage performs image processing.

The determination of the configuration of the pipeline in the image processing unit 150 by the input/output position determination unit 180 is not limited to only the viewpoint of the bus bandwidth of the DMA bus 110 described above. For example, the configuration of the pipeline in the image processing unit 150 may be determined from the viewpoint of power consumption in the imaging device 1. For example, in the case where the imaging device 1 is configured to include a plurality of image processing devices 10 having the same configuration, even if the operation of any of the image processing devices 10 is stopped, the necessary pipeline configuration may be configured by the image processing unit 150 provided in another image processing device 10 in some cases. In this case, the input/output position determination unit 180 stops the operation of the image processing device 10 that can be stopped, and determines the configuration of the pipeline by the image processing unit 150 provided in each of the image processing devices 10 so that the image processing unit 150 provided in another image processing device 10 configures a necessary pipeline.

The communication interface unit 192 is an interface unit for outputting (transmitting) information on the configuration of the pipeline determined by the input/output position determination unit 180 to another image processing device 10 provided in the imaging device 1. Further, the communication interface unit 191 is an interface unit for receiving setting information of the configuration of the pipeline determined by the input/output position determination unit 180 provided in the other image processing device 10 provided in the imaging device 1 and output (transmitted) via the communication interface unit 192, and control information (information for changing (setting) the configuration of the pipeline of the image processing unit 150), for example, output from the outside of the image processing device 10 such as a system control device.

As the transmission method for each of the communication interface unit 191 and the communication interface unit 192 transmitting information for changing (setting) the configuration of the pipeline to/from the outside, various existing specifications and methods used in the transmission of data among a plurality of system LSIs can be used. For example, as a transmission method for transmitting to the outside information for changing (setting) the configuration of the pipeline in the communication interface unit 191 and the communication interface unit 192, it is also possible to use a transmission method according to various predetermined communication methods and specifications such as UART (Universal Asynchronous Receiver-Transmitter), I2C (Inter-Integrated Circuit), SPI (Serial Peripheral Interface), or the like. Also, as a transmission method for transmitting information with the outside for changing (setting) the configuration of the pipeline in the communication interface unit 191 and the communication interface unit 192, it is also possible to use a transmission method conforming to various high-speed serial bus specifications defined in advance such as PCI-Express, USB, or the like. The specification and transmission method for transmitting information for changing (setting) the configuration of the pipeline with the outside in the communication interface unit 191 and the communication interface unit 192 are not limited to the above-described specification and transmission method. Then, each of the communication interface unit 191 and the communication interface unit 192 corresponds to a plurality of specifications and transmission methods used for transmission of data among a plurality of system LSIs, and may change the specification or transmission method used when transmitting information for changing (setting) the configuration of the pipeline with the outside, depending on the amount of information for changing (setting) the configuration of the pipeline. Therefore, in the present invention, the specification and transmission method for transmitting information for changing (setting) the configuration of the pipeline with the outside in the communication interface unit 191 and the communication interface unit 192 are not particularly defined.

With such a configuration, the image processing device 10 causes the DRAM 70 to store image data processed by the imaging processing unit 130 with respect to a pixel signal (pixel data) output from an imager (not shown) provided in the imaging device 1. Thereafter, in the image processing device 10, the image processing unit 150 performs a series of image processing on the pixel data stored in the DRAM 70 by pipeline processing to store in the DRAM 70 again. At this time, the image processing unit 150 incorporates the input/output module 154 into the pipeline configuration so that it is possible to incorporate the external image processing by the external image processing device external to the image processing device 10 into the pipeline processing which is not performed in any of the image processing modules 153 provided in the image processing unit 150. In other words, in the image processing device 10, pipeline processing in the image processing unit 150 can be expanded. Then, in the image processing device 10, the display processing unit 210 generates display image data according to the display image data stored in the DRAM 70, and causes a display device (not shown) provided in the imaging device 1 to display the display image data. Further, in the image processing device 10, image data for recording (recording image data) stored in the DRAM 70 is recorded on a recording medium (not shown) provided in the imaging device 1 via the memory card interface unit 230. The image processing device 10 also outputs (transmits) the image data stored in the DRAM 70 to another device (not shown) via the high-speed serial interface unit 240.

Further, in the image processing device 10, the operation detection unit 170 detects the operation of each component provided in the image processing device 10. Then, in the image processing device 10, the input/output position determination unit 180 determines the configuration of the pipeline in the image processing unit 150 for making the bus band of the DMA bus 110 within the maximum bandwidth when each component provided in the image processing device 10 accesses the DRAM 70 according to the operation information output from the operation detection unit 170, and changes the pipeline processing performed in the image processing unit 150. As a result, in the image processing device 10, compression of the bus band of the DMA bus 110 due to pipeline processing performed in the image processing unit 150 can be avoided. In other words, in the image processing device 10, each component provided in the image processing device 10 can secure a bus band necessary for accessing the DRAM 70. As a result, in the imaging device 1 including the image processing device 10, it is possible to avoid a decrease in the overall processing capacity (speed) of the imaging device 1 caused by the compression of the bus band of the DMA bus 110 by the image processing unit 150 provided in the image processing device 10.

Further, when the imaging device 1 is configured to include a plurality of image processing devices 10, the input/output position determination unit 180 included in the image processing device 10 in the previous stage determines the configuration of the pipeline in the image processing unit 150 according to the operation information output from the operation detection unit 170 so that the pipeline processing in the image processing unit 150 is shared by the image processing unit 150 provided in each of the plurality of image processing devices 10. Then, the input/output position determination unit 180 provided in the image processing device 10 in the previous stage outputs information on the determined configuration of the pipeline to the image processing device 10 in the subsequent stage. Thus, in the imaging device 1 including a plurality of image processing devices 10, the configuration of the pipeline can be changed so that the image processing unit 150 provided in the image processing device 10 in the subsequent stage shares a part of pipeline processing performed by the image processing device 10 in the previous stage. As a result, in the imaging device 1 including the plurality of image processing devices 10, it is possible to perform a series of image processing in pipeline processing shared by the plurality of image processing devices 10 without causing a decrease in the overall processing capacity (speed). In other words, in the image processing device 10, the load of pipeline processing in the image processing unit 150 provided in each of the image processing devices 10 can be reduced.

In the image processing device 10 shown in FIG. 1, a case was described in which the operation detection unit 170 and the input/output position determination unit 180 are provided independently, and the configuration of the pipeline determined by the input/output position determination unit 180 is set in the connection switching unit 151. In this configuration, as described above, the operation information in each component provided in the image processing device 10 detected by the operation detection unit 170 can be obtained from the setting value or the like set for each component by the CPU 140. Here, the CPU 140 detects that the operation mode of the imaging device 1 has been changed, for example, by an operation performed on switches and buttons provided as a user interface in the imaging device 1, acquires the setting value to be set for each component, for example, from the memory (ROM; Read Only Memory), flash memory, or the like in which the setting value is stored for each operation mode of the imaging device 1, and sets the acquired setting value to each component provided in the image processing device 10. Therefore, when the CPU 140 detects a change in the operation mode of the imaging device 1 and acquires setting values to be set for the respective components from the memory, it can be said that it already has operation information detected by the operation detection unit 170 on each component provided in the image processing device 10. From this, in the image processing device 10, the CPU 140 may implement the function of the operation detection unit 170. Further, the CPU 140 sets the acquired set value in each component provided in the image processing device 10 and controls each component. Therefore, in the image processing device 10, the CPU 140 may perform the function of the input/output position determination unit 180. Therefore, in the image processing device 10, instead of separately providing the operation detection unit 170 and the input/output position determination unit 180, the CPU 140 may implement the respective functions of the operation detection unit 170 and the input/output position determination unit 180.

First Operation Example

Next, the operation of the image processing device 10 will be described. First, as a first operation example with the basic operation in the image processing device 10, the flow of data when the image processing device 10 performs pipeline processing in the imaging device 1 having the configuration including one image processing device 10 shown in FIG. 1 will be described. As described above, in the image processing device 10, it is possible to incorporate the external image processing to be performed outside the image processing device 10 in the pipeline by incorporating the input/output module 154 in the pipeline configured in the image processing unit 150. However, in the following description, a case will be described in which external image processing is not incorporated in the pipeline configured in the image processing unit 150, that is, image processing is performed using only the components provided in the image processing device 10.

Figure 2:
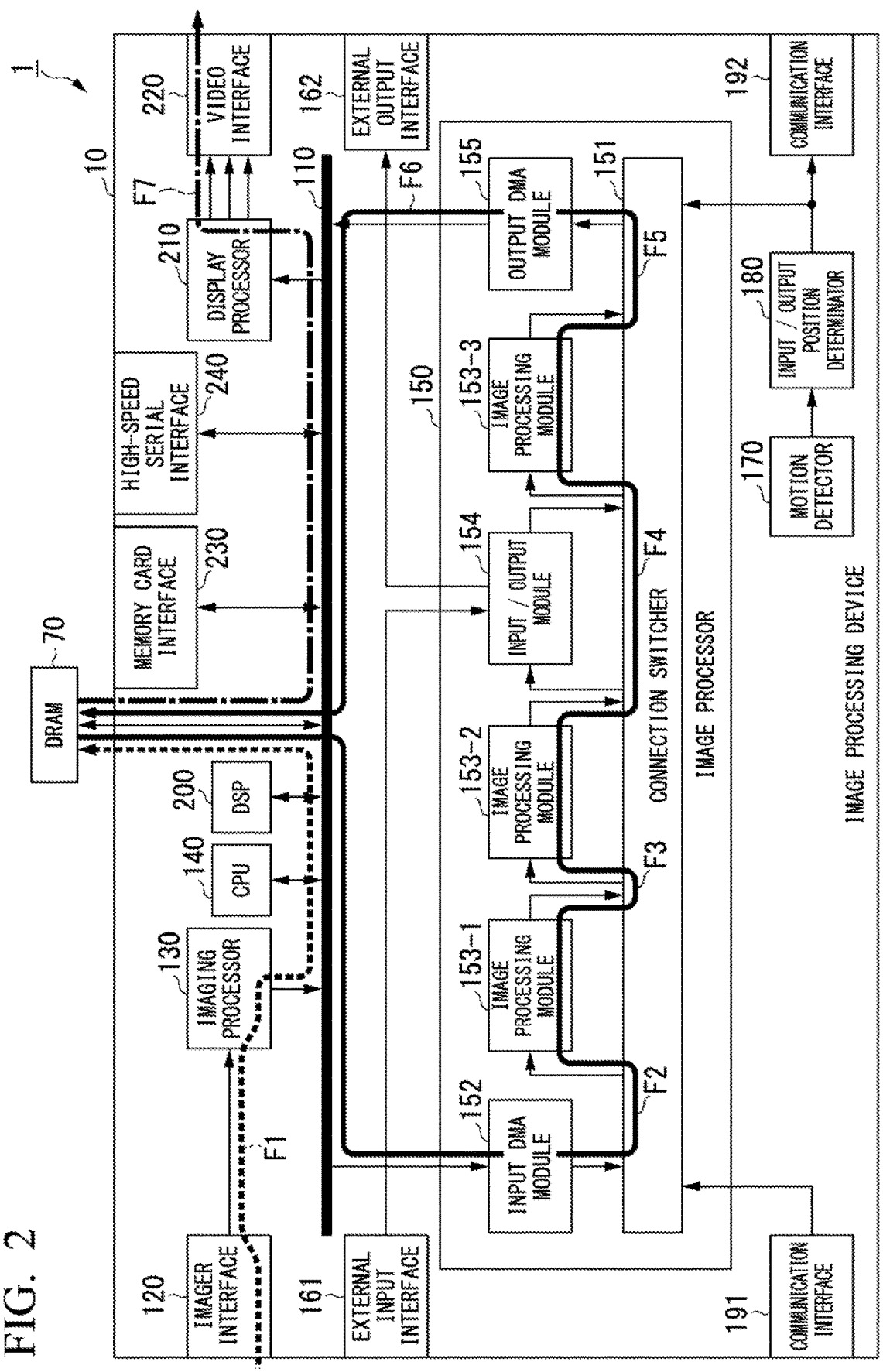
FIG. 2 is a view schematically showing the flow of data in an imaging device provided with the image processing device according to an embodiment of the present invention.

FIG. 2 is a diagram schematically showing the flow of data in the imaging device 1 provided with the image processing device 10 according to the embodiment of the present invention. In the imaging device 1, each component provided in the image processing device 10 performs the respective image processing in parallel, so that the entire image processing in the image processing device 10 is smoothly performed. That is, in the imaging device 1, the preprocessing by the imaging processing unit 130, the pipeline processing by the image processing unit 150, and the display processing by the display processing unit 210 are performed in parallel at the same time in the image processing device 10. However, in the description of the flow of image data shown in FIG. 2, the flow of data will be described focusing on image data of one frame in order to facilitate the description. In the flow of image data shown in FIG. 2, processing is performed in the following flow.

(Flow F1): First, the imager interface unit 120 receives a pixel signal output from an imager (not shown) and outputs (transmits) it to the imaging processing unit 130. Then, the imaging processing unit 130 subjects the pixel data output from the imager interface unit 120 to preprocessing, and writes (stores) the image data including the preprocessed pixel data in the DRAM 70 by DMA via the DMA bus 110.

(Flow F2): Subsequently, the input DMA module 152 provided in the image processing unit 150 reads the image data stored in the DRAM 70 by DMA via the DMA bus 110. Then, the input DMA module 152 outputs the read image data to the image processing module 153-1, which is the connection destination to which image processing is to be performed next, via the connection switching unit 151.

(Flow F3): Subsequently, the image processing module 153-1 performs predetermined image processing on the image data output from the input DMA module 152, which is the connection destination, via the connection switching unit 151, and outputs the processed image data subjected to the image processing to the image processing module 153-2, which is the connection destination to which image processing is to be performed next, via the connection switching unit 151.

(Flow F4): Subsequently, the image processing module 153-2 performs predetermined image processing on the processed image data output from the image processing module 153-1, which is the connection destination, via the connection switching unit 151, and outputs the processed image data after the image processing is further performed, via the connection switching unit 151, to the image processing module 153-3, which is the connection destination to which image processing is to be performed next.

(Flow F5): Subsequently, the image processing module 153-3 performs predetermined image processing on processed image data output from the image processing module 153-2, which is the connection destination, via the connection switching unit 151, and outputs the processed image data after further image processing to the output DMA module 155 via the connection switching unit 151. Here, it is assumed that the image processing module 153-3 performs image processing for generating display image data according to the processed image data output from the image processing module 153-2. Accordingly, the image processing module 153-3 outputs the image data for display to the output DMA module 155 via the connection switching unit 151.

(Flow F6): Subsequently, the output DMA module 155 writes (stores) the processed image data (image data for display) output from the image processing module 153-3, which is the connection destination, via the connection switching unit 151 in the DRAM 70 by DMA via the DMA bus 110.

(Flow F7): Subsequently, the display processing unit 210 reads out the display image data stored in the DRAM 70 by DMA via the DMA bus 110. Then, the display processing unit 210 performs a predetermined display processing on the read image data for display, and generates display image data according to the image data for display. Thereafter, the display processing unit 210 outputs the generated display image data to the video interface unit 220. Thus, the display device (not shown) displays a display image according to the display image data output from the display processing unit 210 via the video interface unit 220.

In this manner, in the image processing device 10, as shown in the first operation example, preprocessing by the imaging processing unit 130, a pipeline processing by the image processing unit 150, and a display processing by the display processing unit 210 are performed on a pixel signal output from an imager (not shown) provided in the imaging device 1 to display a display image according to display image data on a display device (not shown).

As described above, in the image processing device 10, the entire processing in the imaging device 1 is performed while storing the image data of each stage in the DRAM 70 by the DMA via the DMA bus 110.

Note that, as the display device (not shown) included in the imaging device 1, as described above, there are various types from a small display device that displays an image of relatively low resolution to a large display device that displays an image of high resolution. Then, the image displayed by a display device (not shown) provided in the imaging device 1 is further refined. Further, it is conceivable to further increase the number of pixels in an imager (not shown) provided in the imaging device 1. For this reason, it is assumed that a lot of image processing is performed as the entire processing in the imaging device 1. Then, it is considered that it is difficult for one image processing device 10 to cope with a lot of assumed image processing. That is, in one image processing device 10, it can be considered that it becomes difficult for each component provided in the image processing device 10 to secure the bus band of the DMA bus 110 necessary for performing a lot of image processing in the imaging device 1. For example, although one image processing device 10 can configure the imaging device 1 corresponding to an image having a resolution of full HD size (1920 k×1080), in order to configure the imaging device 1 corresponding to an image having a resolution of 4K size (3840 k×2160), it may be difficult for each component provided in the image processing device 10 to secure a bus band necessary for accessing the DRAM 70.

Therefore, the image processing device 10 includes an output module 154 that has a function of directly inputting image data from and outputting image data to the outside of the image processing device 10 without passing through the DMA bus 110 in the image processing unit 150 which performs pipeline processing. More specifically, the image processing device 10 includes an input/output module 154 to realize a function to directly input/output data with another image processing device or the like provided outside the image processing device 10 through the external input interface unit 161 and the external output interface unit 162. The function for directly inputting image data from and outputting image data to the outside of the image processing device 10 by the input/output module 154 is a function for extending pipeline processing in the image processing unit 150 by incorporating external image processing by an external image processing device into pipeline processing, which is different from image processing to be performed by each of the image processing modules 153-1 to 153-3 provided in the image processing unit 150. However, as described above, the function of the input/output module 154 for directly inputting image data from and outputting image data to the outside of the image processing device 10 can be used in a configuration in which a series of image processing in pipeline processing is shared and performed by the image processing unit 150 provided in each of the plurality of image processing devices 10, by using an external image processing device as another image processing device 10. The imaging device 1 is configured to include a plurality of image processing devices 10 from the beginning, when it is assumed in advance that a large number of image processes are to be performed as the entire processing, to realize a configuration for performing a lot of image processing by using the function of directly inputting image data from and outputting image data to the outside of the image processing device 10 by the input/output module 154. In the case of this configuration, the pipeline configured by the image processing unit 150 included in each image processing device 10 can dynamically changes (sets) the configuration of the pipeline according to the content of the entire processing performed by the imaging device 1.

Second Operation Example

Next, as a second operation example with the operation of each of the image processing devices 10 when the imaging device 1 includes a plurality of image processing devices 10, the flow of data will be described when the image processing device 10 shares the pipeline processing. In the second operation example, the imaging device 1 is considered that requires more bus bandwidth to write (store) the image data to the DRAM 70 according to the pixel signal output from the imager by providing an imager operating at a high frame rate with a high pixel number (large size), and does not require much bus bandwidth to read out image data for display from the DRAM 70 by providing one display device (one-channel output) for displaying low resolution images. In the following description, in order to distinguish from the imaging device 1 having the configuration including one image processing device 10 shown in FIG. 1, the imaging device 1 having the configuration of the second operation example described above is referred to as "imaging device 2".

Figure 3:
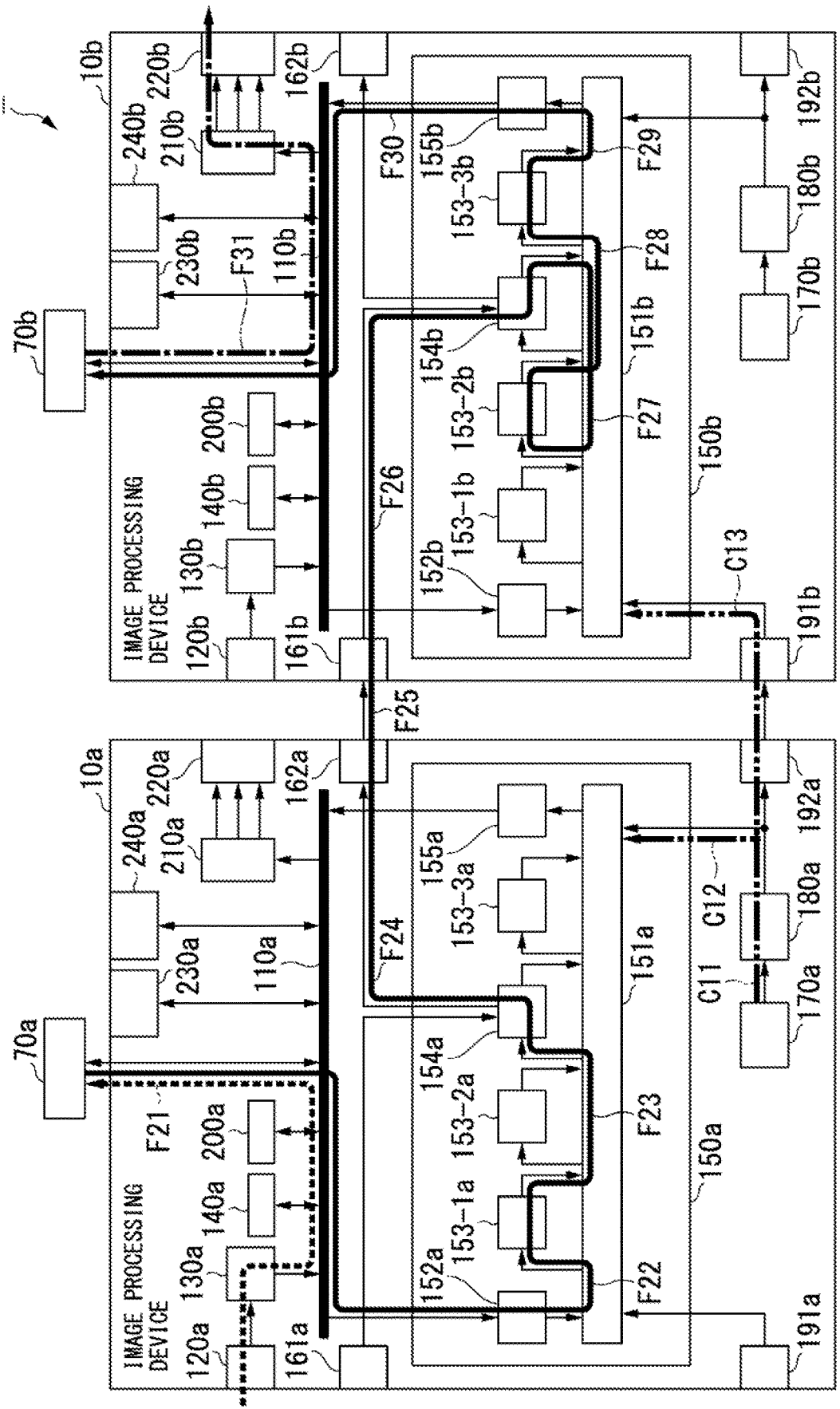
FIG. 3 is a view schematically showing the flow of data in an imaging device having a configuration including a plurality of image processing devices according to an embodiment of the present invention.

FIG. 3 is a diagram schematically showing the flow of data in the imaging device 2 configured to include a plurality of image processing devices 10 according to the embodiment of the present invention. The imaging device 2 shown in FIG. 3 includes two image processing devices 10 having the same configuration. In the imaging device 2 shown in FIG. 3, in order to distinguish each of the two image processing devices 10, the image processing device 10 on the side that receives the pixel signal output from the imager (not shown) is referred to as an "image processing device 10a", and the image processing device 10 on the side that displays a display image on a display device (not shown) is referred to as an "image processing device 10b". Then, in the image imaging device 2 shown in FIG. 3, in order to distinguish whether each component provided in each image processing device 10 is a component of the image processing device 10a or a component of the image processing device 10b, code "a" representing that it is a component of the image processing device 10a or "b" representing that it is a component of the image processing device 10b is attached to each component. Further, in the imaging device 2 shown in FIG. 3, the DRAM 70 corresponding to the image processing device 10a (DRAM 70 connected to the DMA bus 110a in the image processing device 10a) is represented as "DRAM 70a", and the DRAM 70 corresponding to the image processing device 10b (DRAM 70 connected to the DMA bus 110b in the image processing device 10b) is represented as "DRAM 70b". In the following description, in the case where it is not distinguished whether it is a component related to the image processing device 10a or a component related to the image processing device 10b, "a" or "b" is not given.

In the imaging device 2 shown in FIG. 3, pipeline processing is shared by the configuration in which the external output interface unit 162a provided in the image processing device 10a and the external input interface unit 161b provided in the image processing device 10b are connected to each other. Then, in the imaging device 2 shown in FIG. 3, the communication interface unit 192a provided in the image processing device 10a and the communication interface unit 191b provided in the image processing device 10b are connected to each other, so that a configuration for sharing pipeline processing is realized by the image processing unit 150a provided in the image processing device 10a and the image processing unit 150b provided in the image processing device 10b.

In the setting of the configuration of the pipeline in the imaging device 2, first, the operation detection unit 170a provided in the image processing device 10a detects the operation of each component in the configuration in which the image processing device 10a and the image processing device 10b are connected to each other. More specifically, as the imaging operation in the image processing device 10a, the operation detection unit 170a detects the operations of the imager interface unit 120a and the imaging processing unit 130a set corresponding to an imager (not shown) having a large number of pixels (large size) and operating at a high frame rate. In addition, as a display operation in the image processing device 10b, the operation detection unit 170a detects the operation of the display processing unit 210b and the video interface unit 220b set corresponding to one (one-channel output) display device (not shown) for displaying a low resolution image. Also, as an operation of image processing in the image processing unit 150 provided in the image processing device 10a and the image processing device 10b, the operation detection unit 170a detects the operation of the input DMA module 152, the image processing modules 153-1 to 153-3, the input/output module 154, and the output DMA module 155. At this stage, the operation detection unit 170a does not determine whether the input DMA module 152, the image processing modules 153-1 to 153-3, the input/output module 154, and the output DMA module 155 are components provided in the image processing device 10a or components provided in the image processing device 10b. The operation detection unit 170a outputs the detected operation information of each component to the input/output position determination unit 180a provided in the image processing device 10a (path C11).

Thereby, the input/output position determination unit 180a determines the configuration of a pipeline that shares pipeline processing with the image processing unit 150a and the image processing unit 150b according to the operation information output from the operation detection unit 170a. Here, since the imager (not shown) provided in the imaging device 2 is an imager operating at a high frame rate with a large number of pixels (large size), the operation information output from the operation detection unit 170a represents that the DMA bus 110a in the image processing device 10a requires many bus bandwidths. Since the display device (not shown) provided in the imaging device 2 is a single (one-channel output) display device that displays an image of low resolution, the operation information output from the operation detection unit 170a represents that the DMA bus 110b in the image processing device 10b does not need much bus bandwidth. Therefore, the input/output position determination unit 180a determines the configuration of the pipeline in the image processing unit 150a and the image processing unit 150b so that the image processing performed in the image processing unit 150a provided in the image processing device 10a is reduced, and more image processing is performed in the image processing unit 150b provided in the image processing device 10b. More specifically, in the flow of the image data shown in FIG. 3, the input/output position determination unit 180a determines the configuration of the pipeline in the processing unit 150a so that the image processing unit 150a performs the image processing by the image processing module 153-1a. Further, in the image data flow diagram shown in FIG. 3, the input/output position determination unit 180a determines the configuration of the pipeline in the processing unit 150b so that the image processing unit 150b performs image processing by the image processing module 153-2b and the image processing module 153-3b.

The input/output position determination unit 180a sets the pipeline configuration determined for the image processing unit 150a in the connection switching unit 151a included in the image processing unit 150a (path C12). Further, the input/output position determination unit 180a outputs the information on the determined configuration of the pipeline in the image processing unit 150b to the communication interface unit 192a, to set to the connection switching unit 151b provided in the image processing unit 150b via the communication interface unit 192a and the communication interface unit 191b (path C13).

In the image processing device 10a and the image processing device 10b, each component performs image processing with the configuration of the pipeline set by the input/output position determination unit 180a. Also in the imaging device 2, the respective components provided in the image processing device 10a and the image processing device 10b perform the respective image processing in parallel, whereby the entire image processing in the imaging device 2 is smoothly performed. That is, in the imaging device 2, preprocessing by the imaging processing unit 130a included in the image processing device 10a, pipeline processing shared by the image processing unit 150 included in each of the image processing device 10a and the image processing device 10b, and display processing by the display processing unit 210b provided in the image processing device 10b are performed in parallel at the same time. However, in the description of the flow of image data shown in FIG. 3, the flow of data will be described focusing on image data of one frame in order to facilitate the description. In the flow of image data shown in FIG. 3, processing is performed in the following flow.

(Flow F21): First, the imager interface unit 120a included in the image processing device 10a receives a pixel signal output from an imager (not shown) and outputs (transmits) it to the imaging processing unit 130a. Then, the imaging processing unit 130a performs preprocessing on pixel data output from the imager interface unit 120a, and writes (stores) the image data including the pixel data subjected to the preprocessing in the DRAM 70a by DMA via the DMA bus 110a.

(Flow F22): Subsequently, the input DMA module 152a in the image processing unit 150a included in the image processing device 10a reads the image data stored in the DRAM 70a by DMA via the DMA bus 110a. Then, the input DMA module 152a outputs the read image data to the image processing module 153-1a, which is the connection destination to which image processing is to be performed next, via the connection switching unit 151a.

(Flow F23): Subsequently, the image processing module 153-1a performs predetermined image processing on the image data output from the input DMA module 152a, which is the connection destination, via the connection switching unit 151a, and outputs the processed image data subjected to the image processing to the input/output module 154a via the connection switching unit 151a.

(Flow F24): Subsequently, the input/output module 154a outputs the processed image data, which is output from the image processing module 153-1a, which is the connection destination, via the connection switching unit 151a, directly to the external output interface unit 162a without passing through the DMA bus 110a.

(Flow F25): Thus, the external output interface unit 162a outputs (transmits) the processed image data output from the input/output module 154a, that is, the processed image data processed by the image processing module 153-1a, to the external input interface unit 161b provided in the image processing device 10b.

(Flow F26): Thereby, the external input interface unit 161b receives the processed image data output (transmitted) from the external output interface unit 162a, that is, the processed image data processed by the image processing module 153-1a, and directly outputs (transmits) the received processed image data to the input/output module 154b provided in the image processing unit 150b without passing through the DMA bus 110b.

(Flow F27): Subsequently, the input/output module 154b outputs the processed image data output (transmitted) from the external input interface unit 161*b* to the image processing module 153-2*b*, which is the connection destination to which image processing is to be performed next, via the connection switching unit 151*b*.

(Flow F28): Subsequently, the image processing module 153-2*b* performs predetermined image processing on the processed image data output from the input/output module 154*b*, which is the connection destination, via the connection switching unit 151*b*, and outputs the processed image data subjected to the image processing to the image processing module 153-3*b* which is the connection destination to which image processing is to be performed next, via the connection switching unit 151*b*.

(Flow F29): Subsequently, the image processing module 153-3*b* performs predetermined image processing on the processed image data output from the image processing module 153-2*b*, which is the connection destination, via the connection switching unit 151*b*, and outputs the processed image data after the image processing to the output DMA module 155*b* via the connection switching unit 151*b*. Here, it is assumed that the image processing module 153-3*b* performs image processing for generating display image data according to the processed image data output from the image processing module 153-2*b*. Therefore, the image processing module 153-3*b* outputs the image data for display to the output DMA module 155*b* via the connection switching unit 151*b*.

(Flow F30): Subsequently, the output DMA module 155*b* writes (stores) the processed image data (image data for display) output from the image processing module 153-3*b*, which is the connection destination, via the connection switching unit 151*b*, in the DRAM 70*b* by DMA via the DMA bus 110*b*.

(Flow F31): Subsequently, the display processing unit 210*b* reads out the display image data stored in the DRAM 70*b* by DMA via the DMA bus 110*b*. Then, the display processing unit 210*b* performs predetermined display processing on the read image data for display, and generates display image data according to the image data for display. Thereafter, the display processing unit 210*b* outputs the generated display image data to the video interface unit 220*b*. Thus, the display device (not shown) displays a display image according to the display image data output from the display processing unit 210*b* via the video interface unit 220*b*.

In this manner, in the imaging device 2, by the configuration including the operation detection unit 170*a* and the input/output position determination unit 180*a* provided in the image processing device 10*a*, the configuration of a pipeline for performing pipeline processing shared with the image processing unit 150*a* provided in the image processing device 10*a* and the image processing unit 150*b* provided in the image processing device 10*b* are set. Thus, as shown in the second operation example, in the imaging device 2, by the configuration of the pipeline set by the configuration of the operation detection unit 170*a* and the input/output position determination unit 180*a*, pipeline processing is shared and performed by the image processing unit 150*a* provided in the image processing device 10*a* and the image processing unit 150*b* provided in the image processing device 10*b*. More specifically, in the imaging device 2, the image processing device 10*a* performs preprocessing by the imaging processing unit 130*a* and image processing by the image processing module 153-1*a* provided in the image processing unit 150*a* as a part of pipeline processing, on pixel signals output from an imager (not shown) provided in the imaging device 2. Further, in the imaging device 2, as part of pipeline processing, image processing by the image processing module 153-1*b* and the image processing module 153-3*b* provided in the image processing unit 150*b* and display processing by the display processing unit 210*b* are performed, thereby displaying a display image corresponding to the display image data on a display device (not shown).

Third Operation Example

Next, another operation of each of the image processing devices 10 in the case where the plurality of image processing devices 10 are provided in the imaging device 1 is taken as a third operation example, and the flow of data in the case where each of the image processing devices 10 shares the pipeline processing will be described. In the third operation example, by providing an imager with a medium pixel count (size) and whose frame rate is not high either, the writing (storage) of the image data to the DRAM 70 according to the pixel signal output from the imager does not require much bus bandwidth. By providing a function of three-channel output to simultaneously display images on three display devices including a display device that displays a high resolution image, the imaging device 1 requires more bus bandwidth by reading image data for display from DRAM 70. In the following description, in order to distinguish from the imaging device 1 having the configuration including one image processing device 10 shown in FIG. 1 and the imaging device 2 shown in FIG. 3, the imaging device 1 having the configuration of the third operation example described above is referred to as "imaging device 3".

Figure 4:
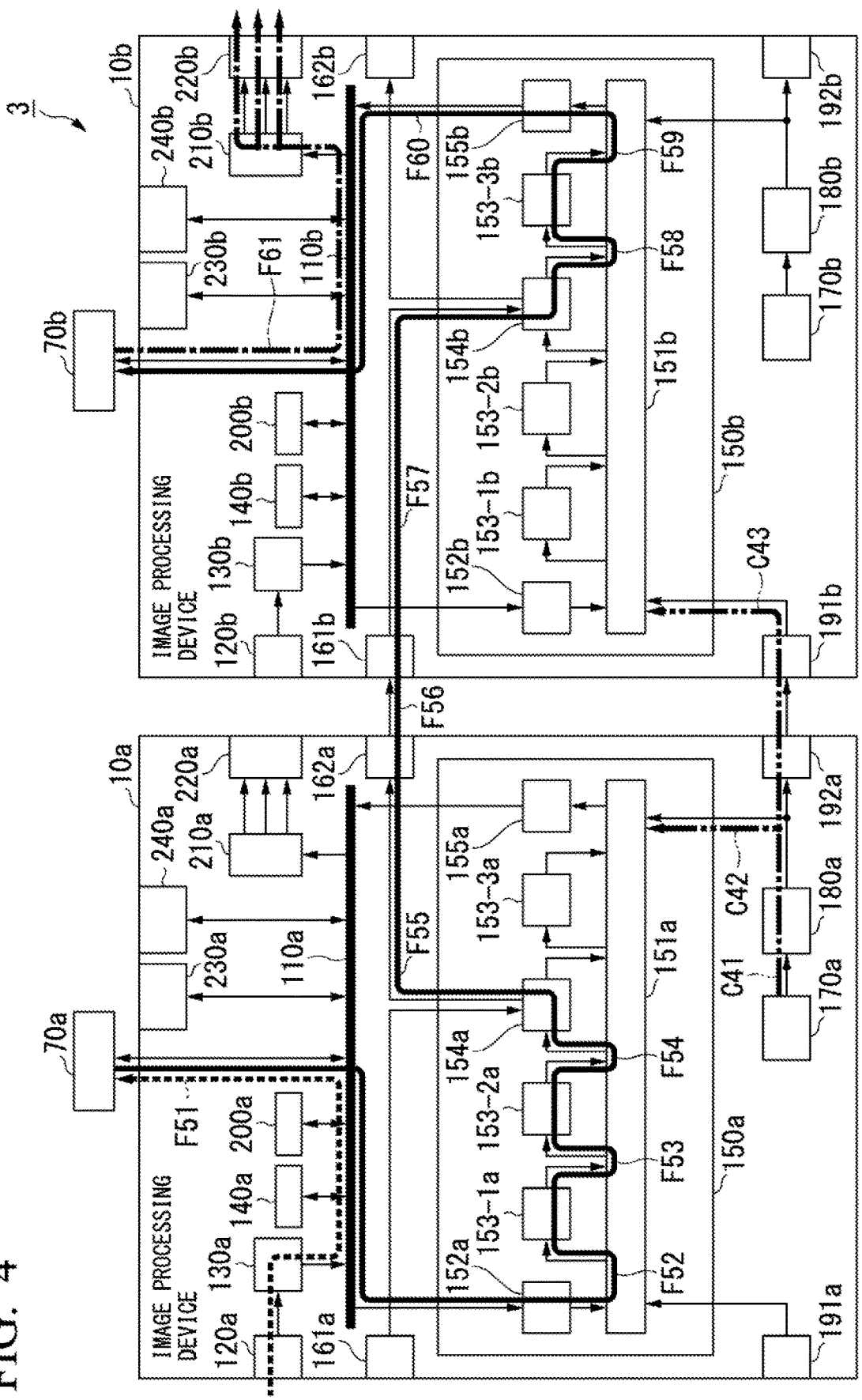
FIG. 4 is a view schematically showing the flow of data in an imaging device of another configuration provided with a plurality of image processing devices according to an embodiment of the present invention.

FIG. 4 is a diagram schematically showing the flow of data in an imaging device 3 of another configuration provided with a plurality of image processing devices 10 according to the embodiment of the present invention. Similarly to the imaging device 2 shown in FIG. 3, the imaging device 3 shown in FIG. 4 also includes two image processing devices 10 having the same configuration. The configuration of the imaging device 3 shown in FIG. 4 is the same as that of the imaging device 2 shown in FIG. 3 except that the imager (not shown) and the display device (not shown) are different. Therefore, also in the imaging device 3 shown in FIG. 4, the respective components are distinguished according to the same idea as the imaging device 2 shown in FIG. 3. That is, also in the image imaging device 3 shown in FIG. 4, the image processing device 10 on the side of receiving the pixel signal output from the imager (not shown) is referred to as "image processing device 10*a*", and by appending "a" to the symbol of each component, it indicates that the component is associated with the image processing device 10*a*. Also in the image imaging device 3 shown in FIG. 4, the image processing device 10 on the side of displaying a display image on a display device (not shown) is referred to as "image processing device 10*b*", and by appending "b" to the symbol of each component, it r indicates that the component is associated with the image processing device 10*b*. In the following description, in the case where it is not distinguished whether it is a component related to the image processing device 10*a* or a component related to the image processing device 10*b*, each component is expressed without giving a code "a" or "b".

Similarly to the imaging device 2 shown in FIG. 3, in the imaging device 3 shown in FIG. 4, a configuration in which pipeline processing is shared and performed is realized by connecting the external output interface unit 162*a* included in the image processing device 10*a* and the external input interface portion 161*b* included in the image processing device 10*b*. Also in the imaging device 3 shown in FIG. 4, as in the imaging device 2 shown in FIG. 3, by connecting the communication interface unit 192*a* included in the image processing device 10*a* and the communication interface unit 191*b* included in the image processing device 10*b*, a configuration for setting a pipeline configuration is realized in which pipeline processing is shared by the image processing unit 150*a* included in the image processing device 10*a* and the image processing unit 150*b* included in the image processing device 10*b*.

Also in the setting of the configuration of the pipeline in the imaging device 3, in the same manner as the imaging device 2, first, by the configuration in which the operation detection unit 170*a* included in the image processing device 10*a* connects the image processing device 10*a* and the image processing device 10*b*, the movement of each component is detected. More specifically, the operation detection unit 170*a* detects the operation of the imager interface unit 120*a* and the imaging processing unit 130*a* set corresponding to an imager (not shown) having a medium pixel count (size) and whose frame rate is not high, as the imaging operation in the image processing device 10*a*. Further, the operation detection unit 170*a* detects the operation of the display processing unit 210*b* and the video interface unit 220*b* set corresponding to each of three (three-channel output) display devices (not shown) including a display device for displaying an image of high resolution, as a display operation in the image processing device 10*b*. The operation detection unit 170*a* detects the operation of the input DMA module 152, the image processing modules 153-1 to 153-3, the input/output module 154, and the output DMA module 155, as an operation of image processing in the image processing unit 150 provided in the image processing device 10*a* and the image processing device 10*b*. At this stage, the operation detection unit 170*a* does not determine whether the input DMA module 152, the image processing modules 153-1 to 153-3, the input/output module 154, and the output DMA module 155 are the components included in the image processing device 10*a* or the components included in the image processing device 10*b*, like the imaging device 2. The operation detection unit 170*a* outputs the operation information of each of the detected components to the input/output position determination unit 180*a* included in the image processing device 10*a* (path C41).

Thereby, the input/output position determination unit 180*a* determines the configuration of a pipeline that shares pipeline processing by the image processing unit 150*a* and the image processing unit 150*b* according to the operation information output from the operation detection unit 170*a*. Here, since the imager (not shown) provided in the imaging device 3 is an imager having a medium number of pixels (size) and whose frame rate is not high, the operation information output from the operation detection unit 170*a* indicates that the DMA bus 110*a* in the image processing device 10*a* does not require much bus bandwidth. Further, since a display device (not shown) provided in the imaging device 3 is a three (three-channel output) display device including a display device for displaying an image of high resolution and has a function of displaying an image simultaneously, the operation information output from the operation detection unit 170*a* indicates that the DMA bus 110*b* in the image processing device 10*b* requires much bus bandwidth. Therefore, the input/output position determination unit 180*a* determines the configuration of the pipeline in the image processing unit 150*a* and the image processing unit 150*b* so that more image processing is performed in the image processing unit 150*a* included in the image processing device 10*a* and the image processing performed in the image processing unit 150*b* included in the image processing device 10*b* is reduced. More specifically, in the flow of image data shown in FIG. 4, the input/output position determination unit 180*a* determines the configuration of the pipeline in the image processing unit 150*a* in which image processing is performed by the image processing modules 153-1*a* and the image processing module 153-2*a* respectively in the image processing unit 150*a*. Further, in the image data flow diagram shown in FIG. 4, the input/output position determination unit 180*a* determines the configuration of pipeline in the image processing unit 150*b* in which image processing is performed by the image processing module 153-3*b* in the image processing unit 150*b*.

The input/output position determination unit 180*a* sets the configuration of pipeline determined for the image processing unit 150*a* in the connection switching unit 151*a* included in the image processing unit 150*a* (path C42). Further, the input/output position determination unit 180*a* outputs the information on the determined configuration of the pipeline to the image processing unit 150*b* to the communication interface unit 192*a*, and sets it to the connection switching unit 151*b* included in the image processing unit 150*b*, via the communication interface unit 192*a* and the communication interface unit 191*b* (path C43).

In the image processing device 10*a* and the image processing device 10*b*, each component performs image processing with the configuration of the pipeline set by the input/output position determination unit 180*a*. In the imaging device 3 as well as the imaging device 2, the respective components provided in the image processing device 10*a* and the image processing device 10*b* perform the respective image processing in parallel, so that the entire image processing in the imaging device 3 is smoothly performed. That is, in the imaging device 3 as well as the imaging device 2, the preprocessing by the imaging processing unit 130*a* included in the image processing device 10*a*, the pipeline processing shared by the image processing unit 150 provided in each of the image processing device 10*a* and the image processing device 10*b*, and the display processing by the display processing unit 210*b* provided in the image processing device 10*b* are performed in parallel at the same time. However, in the explanation of the flow of image data shown in FIG. 4 as well as the explanation of the flow of image data shown in FIG. 3, to facilitate the description, the flow of data will be described focusing on image data of one frame. In the flow of image data shown in FIG. 4, processing is performed in the following flow.

(Flow F51): First, the imager interface unit 120*a* included in the image processing device 10*a* receives a pixel signal output from an imager (not shown) and outputs (transmits) it to the imaging processing unit 130*a*. Then, the imaging processing unit 130*a* performs preprocessing on pixel data output from the imager interface unit 120*a*, and writes (stores) the image data including the preprocessed pixel data in the DRAM 70*a* by DMA via the DMA bus 110*a*.

(Flow F52): Subsequently, the input DMA module 152*a* in the image processing unit 150*a* included in the image processing device 10*a* reads the image data stored in the DRAM 70*a* by DMA via the DMA bus 110*a*. Then, the input DMA module 152*a* outputs the read image data to the image processing module 153-1*a*, which is the connection destination to which image processing is to be performed next, via the connection switching unit 151*a*.

(Flow F53): Subsequently, the image processing module 153-1*a* performs predetermined image processing on the image data output from the input DMA module 152*a*, which is the connection destination, via the connection switching unit 151a, and outputs the processed image data subjected to the image processing to the image processing module 153-2a, which is the connection destination to which image processing is to be performed next, via the connection switching unit 151a.

(Flow F54): Subsequently, the image processing module 153-2a performs predetermined image processing on the processed image data output from the image processing module 153-1a, which is the connection destination, via the connection switching unit 151a, and outputs the processed image data after the image processing to the input/output module 154a via the connection switching unit 151a.

(Flow F55): Subsequently, the input/output module 154a directly outputs the processed image data, which is output from the image processing module 153-2a, which is the connection destination, via the connection switching unit 151a, to the external output interface unit 162a without passing through the DMA bus 110a.

(Flow F56): Thereby, the external output interface unit 162a outputs (transmits) the processed image data output from the input/output module 154a, that is, the processed image data processed by the image processing module 153-2a, to the external input interface unit 161b provided in the image processing device 10b.

(Flow F57): Thereby, the external input interface unit 161b receives the processed image data output (transmitted) from the external output interface unit 162a, that is, the processed image data processed by the image processing module 153-2a, and outputs (transmits) the received processed image data directly to the input/output module 154b provided in the image processing unit 150b without passing through the DMA bus 110b.

(Flow F58): Subsequently, the input/output module 154b outputs the processed image data, which is output (transmitted) from the external input interface unit 161b, via the connection switching unit 151b to the image processing module 153-3b, which is the connection destination to which image processing is to be performed next.

(Flow F59): Subsequently, the image processing module 153-3b performs predetermined image processing on the processed image data output from the input/output module 154b, which is the connection destination, via the connection switching unit 151b, and outputs the processed image data after image processing to the output DMA module 155b via the connection switching unit 151b. Here, it is assumed that the image processing module 153-3b performs image processing for generating display image data according to the processed image data output from the input/output module 154b. Therefore, the image processing module 153-3b outputs the image data for display to the output DMA module 155b via the connection switching unit 151b.

(Flow F60): Subsequently, the output DMA module 155b writes (stores) the processed image data (image data for display), which is output from the image processing module 153-3b, which is the connection destination, via the connection switching unit 151b, in the DRAM 70b by DMA via the DMA bus 110b.

(Flow F61): Subsequently, the display processing unit 210b reads out the display image data stored in the DRAM 70b by DMA via the DMA bus 110b. Then, the display processing unit 210b performs predetermined display processing on the read image data for display, and generates display image data according to the image data for display. Here, since the imaging device 3 has a function of three-channel output for simultaneously displaying an image on three display devices including a display device for displaying an image of high resolution, the display processing unit 210b generates display image data for three channels, that is, three types of display image data. Thereafter, the display processing unit 210b outputs each of the generated three types of display image data to the video interface unit 220b. As a result, each of the three display devices (not shown) displays a display image corresponding to the corresponding display image data output from the display processing unit 210b via the video interface unit 220b.

In this manner, in the imaging device 3 as well as the imaging device 2, the configuration of a pipeline for performing pipeline processing shared by the image processing unit 150a provided in the image processing device 10a and the image processing unit 150b provided in the image processing device 10b is set by the configuration of the operation detection unit 170a and the input/output position determination unit 180a included in the image processing device 10a. Thus, as shown in the third operation example, in the imaging device 3, by the configuration of pipeline set by the configuration of the operation detection unit 170a and the input/output position determination unit 180a, the image processing unit 150a provided in the image processing device 10a and the image processing unit 150b provided in the image processing device 10b share and perform pipeline processing. More specifically, in the imaging device 3, the image processing device 10a performs preprocessing by the imaging processing unit 130a and image processing by the image processing module 153-1a and the image processing module 153-2a provided in the image processing unit 150a as a part of the pipeline processing, on pixel signals output from an imager (not shown) provided in the imaging device 3. In addition, in the imaging device 3, as part of pipeline processing, image processing by the image processing module 153-3b provided in the image processing unit 150b and display processing by the display processing unit 210b are performed displayed image according to display image data is displayed on each display device (not shown).

As described above, the imaging device includes a plurality of image processing devices 10, so a series of image processing in pipeline processing included in the entire processing performed by the imaging device can be shared and performed by the image processing unit 150 provided in each of the plurality of image processing devices 10. At this time, with the configuration of the operation detection unit 170 and the input/output position determination unit 180 provided in any one image processing device 10, the configuration of the pipeline in the image processing unit 150 provided in each of the image processing device 10 can be dynamically changed (set) in accordance with the content of the entire processing performed by the imaging device. As a result, in one image processing device 10, even when it is considered difficult to secure the bus bandwidth of the DMA bus 110 necessary for performing a large number of image processing in the imaging device, by sharing the pipeline processing by the components included in each of the plurality of image processing devices 10, it is possible to secure the necessary bus bandwidth of the DMA bus 110 as the entire imaging device, and it is possible to perform a lot of image processing in the imaging device.

In the imaging device 2 shown in the second operation example and the imaging device 3 shown in the third operation example, the case where two image processing devices 10 having the same configuration are provided has been described. However, the number of image processing devices 10 constituting the imaging device is not limited to two shown in the second operation example and the third operation example. That is, the imaging device may be provided with more image processing devices 10. In this case, in the imaging device, all the image processing devices 10 are connected in series (for example, in a chain of beads) as in the imaging device 2 shown in the second operation example and the imaging device 3 shown in the third operation example. As a result, pipeline processing can be shared and performed by the image processing unit 150 provided in each of the image processing devices 10 provided in the imaging device.

In addition, in the imaging device 3 shown in the third operation example, the configuration has been described in which the image processing device 10b has a function of three-channel output that causes images to be simultaneously displayed on three display devices (not shown). However, in an imaging device provided with a plurality of image processing devices 10, the function of displaying an image on each display device (not shown) can also be configured to be divided into a plurality of image processing devices 10. For example, in an imaging device which realizes the same function as the imaging device 3 shown in the third operation example, respective three image processing devices 10b may be connected in parallel to the image processing device 10a. That is, three image processing devices 10b can be connected to the image processing device 10a in a tree shape. In this case, the image processing device 10a outputs the processed image data after the image processing module 153-2a has performed the image processing in parallel to the respective image processing devices 10b. Then, in each of the image processing devices 10b, the image processing module 153-3b writes (stores) the display image data after image processing to the corresponding DRAM 70b. Thereafter, the display processing unit 210 provided in each of the image processing devices 10b generates display image data according to the image data for display stored in the corresponding DRAM 70b, and causes a connected display device (not shown) to display a display image according to the display image data. As a result, each image processing device 10b can realize the same function as the imaging device 3 shown in the third operation example, only by providing the function of one-channel output. When the imaging device of this configuration is provided with a component for selecting a display device (not shown) for outputting display image data (select one or more), not only can images be simultaneously displayed on three display devices (not shown), but also a display image corresponding to the display image data can be displayed on the selected one or more display devices (not shown).

Further, in the imaging device 2 shown in the second operation example and the imaging device 3 shown in the third operation example, the configuration has been described in which the image processing device 10a receives the pixel signal output from the imager (not shown), and the image processing device 10b displays the display image is on the display device (not shown). However, in an imaging device provided with a plurality of image processing devices 10, the image processing device 10 connecting an imager (not shown) and the image processing device 10 connecting a display device (not shown) are not limited to different image processing devices 10. That is, in an imaging device provided with a plurality of image processing devices 10, the image processing device 10 connecting an imager (not shown) and the image processing device 10 connecting a display device (not shown) may be the same image processing device 10. In this case, in the image imaging device, all the image processing devices 10 are connected in series (for example, in a series connection), and further, the image processing device 10 of the first stage and the image processing device 10 of the last stage are connected to each other, so that all the image processing devices 10 are connected in an annular shape (ring shape). Thus, pipeline processing can be shared by the image processing unit 150 provided in each of the image processing devices 10 provided in the imaging device, and processed image data subjected to image processing in the imaging device can be collected (aggregated) in the DRAM 70 (DRAM 70 connected to the DMA bus 110 in one image processing device 10) corresponding to one image processing device 10.

Fourth Operation Example

Next, as a fourth operation example of still another operation of each of the image processing devices 10 in a case when the imaging device 1 is provided with a plurality of image processing devices 10, the flow of data in the case when the image processing device 10 shares and performs processing in the imaging device 1 will be described. In the fourth operation example, writing (storage) of image data to the DRAM 70 according to the pixel signal output from the imager does not require a large bus bandwidth, and reading of the image data for display from the DRAM 70 does not require much bus bandwidth. The imaging device 1 is configured to incorporate DSP image processing by the digital signal processor 200 requiring many bus bandwidths, instead of the image processing module 153-2 in pipeline processing. In the following description, in order to distinguish from the imaging device 1 having the configuration including one image processing device 10 shown in FIG. 1, the imaging device 2 shown in FIG. 3, and the imaging device 3 shown in FIG. 4, the imaging device 1 having the configuration of the fourth operation example described above is referred to as "imaging device 4".

Figure 5:
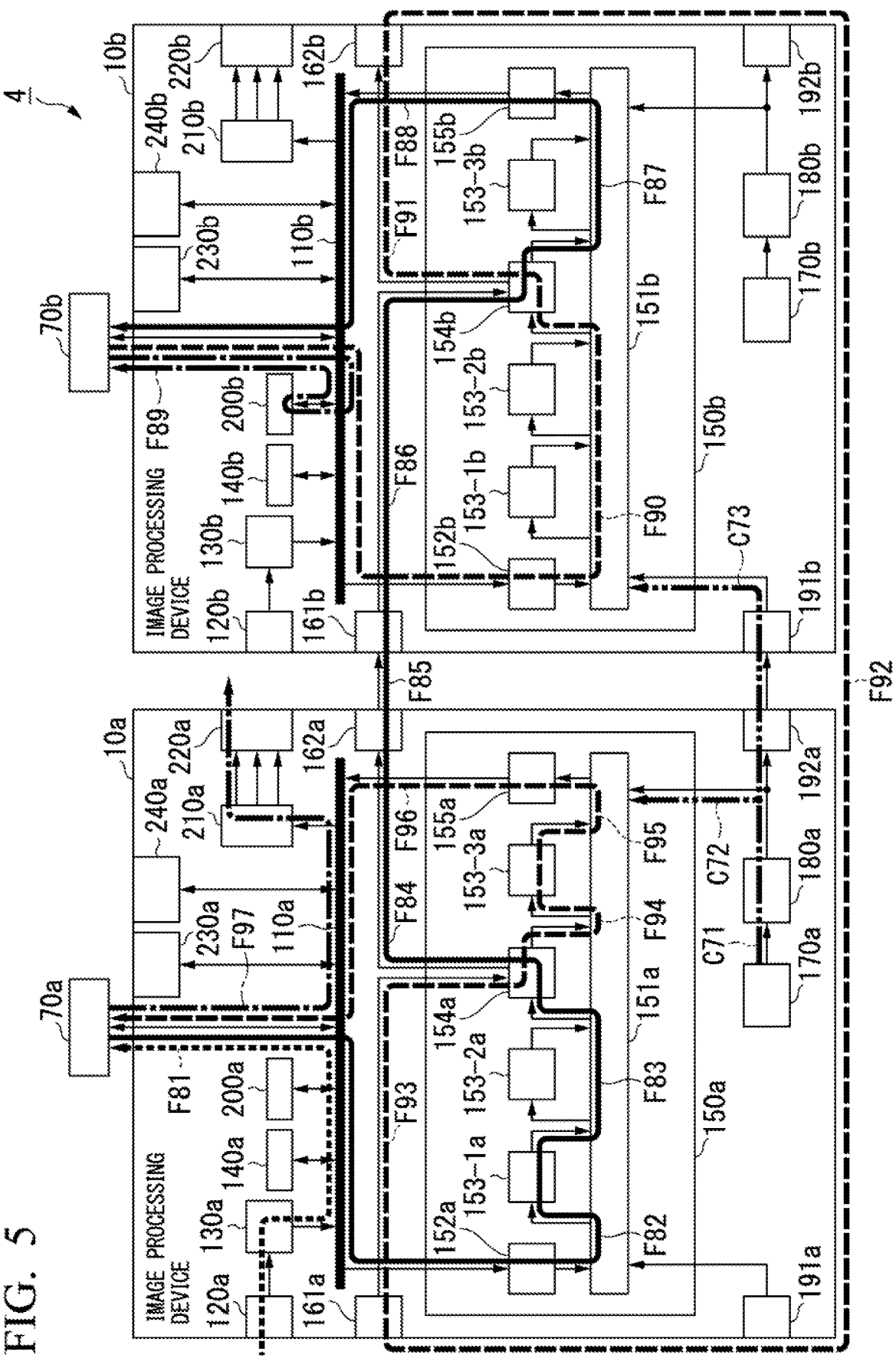
FIG. 5 is a view schematically showing the flow of data in an imaging device of another configuration provided with a plurality of image processing devices according to an embodiment of the present invention.

FIG. 5 is a diagram schematically showing the flow of data in an imaging device 4 of another configuration provided with a plurality of image processing devices 10 according to the embodiment of the present invention. Similarly to the imaging device 2 shown in FIG. 3 and the imaging device 3 shown in FIG. 4, the imaging device 4 shown in FIG. 5 also includes two image processing devices 10 having the same configuration. The configuration of the imaging device 4 shown in FIG. 5 is the same as the configuration of the imaging device 2 shown in FIG. 3 and the imaging device 3 shown in FIG. 4 except that the imager (not shown) and the display device (not shown) are different. Therefore, also in the imaging device 4 shown in FIG. 5, the respective constituent elements are distinguished according to the same idea as the imaging device 2 shown in FIG. 3 and the imaging device 3 shown in FIG. 4.

In the imaging device 4 shown in FIG. 5, both the imager (not shown) and the display device (not shown) are connected to the same image processing device 10a. That is, in the imaging device 4 shown in FIG. 5, the image processing device 10 on the side receiving the pixel signal output from the imager (not shown), and the image processing device 10 on the side displaying the display image on the display device (not shown) are the image processing device 10a. Then, in the imaging device 4 shown in FIG. 5, the external output interface unit 162a included in the image processing device 10a and the external input interface unit 161b included in the image processing device 10b are connected, and the external output interface unit 162b provided in the image processing device 10b and the external input interface unit 161a provided in the image processing device 10a are connected, thereby realizing a configuration in which DSP image processing is incorporated into pipeline processing. Then, in the imaging device 4 shown in FIG. 5, by connecting the communication interface unit 192a provided in the image processing device 10a and the communication interface unit 191b provided in the image processing device 10b, a configuration for setting the configuration of pipeline is realized in which DSP image processing by the digital signal processor 200 is incorporated into pipeline processing to be shared and performed by the image processing unit 150a included in the image processing device 10a and the image processing unit 150b included in the image processing device 10b.

Even in the setting of the configuration of the pipeline in the imaging device 4, as in the imaging device 2 and the imaging device 3, first, in the configuration in which the image processing device 10a and the image processing device 10b are connected, the operation detection unit 170a included in the image processing device 10a detects the operation of each component. More specifically, the operation detection unit 170a detects the operation of the imager interface unit 120a and the imaging processing unit 130a set corresponding to an imager (not shown) having a medium pixel count (size) and whose frame rate is not high, as the imaging operation in the image processing device 10a. Further, the operation detection unit 170a detects the operation of the display processing unit 210a and the video interface unit 220a set corresponding to one (one-channel output) display device (not shown) that displays an image of low resolution, as the display operation in the image processing device 10a. The operation detection unit 170a also detects the operation of the input DMA module 152, the image processing modules 153-1 to 153-3, the input/output module 154, the output DMA module 155, and the digital signal processor 200, as an operation of image processing in the image processing unit 150 provided in the image processing device 10a and the image processing device 10b. At this stage, like the imaging device 2 and the imaging device 3, the operation detection unit 170a does not determine whether the input DMA module 152, the image processing modules 153-1 to 153-3, the input/output module 154, and the output DMA The module 155, and the digital signal processor 200 are components included in the image processing device 10a or components included in the image processing device 10b. The operation detection unit 170a outputs the operation information of each of the detected components to the input/output position determination unit 180a included in the image processing device 10a (path C71).

Thus, the input/output position determination unit 180a determines the configuration of pipeline to incorporate DSP image processing by the digital signal processor 200 into the pipeline shared and processed by the image processing unit 150a and the image processing unit 150b, according to the operation information output from the operation detection unit 170a. Here, since the imager (not shown) provided in the imaging device 4 is an imager having a medium number of pixels (size) and whose frame rate is not high, the operation information output from the operation detection unit 170a indicates that the DMA bus 110a in the image processing device 10a does not require much bus bandwidth. Since the display device (not shown) provided in the imaging device 4 is a single (one-channel output) display device that displays a low-resolution image, the operation information output from the operation detection unit 170a indicates that the DMA bus 110a in the device 10a does not need much bus bandwidth. Further, the operation information output from the operation detection unit 170a indicates that the DSP image processing by the digital signal processor 200 incorporated in place of the image processing module 153-2 in pipeline processing requires many bus bandwidths in the DMA bus 110a in the image processing device 10a or the DMA bus 110b in the processing device 10b. Therefore, the input/output position determination unit 180a performs the image processing by the image processing module 153 to be performed in the image processing unit 150a included in the image processing device 10a, and determines the configuration of the pipeline in the image processing unit 150a and the image processing unit 150b, which incorporates the DSP image processing by the digital signal processor 200b into the image processing unit 150b included in the image processing device 10b. More specifically, in the flow of the image data shown in FIG. 5, the input/output position determination unit 180a determines the configuration of the pipeline in the image processing unit 150a on which the image processing is performed by the image processing module 153-1a in the image processing unit 150a. Furthermore, in the image data flow diagram shown in FIG. 5, the input/output position determination unit 180a determines the configuration of the pipeline in the image processing unit 150a on which the image processing is performed by the image processing module 153-3a in the image processing unit 150a. Further, in the image data flow diagram shown in FIG. 5, the input/output position determination unit 180a determines the configuration of the pipeline in the image processing unit 150b on which DSP image processing is performed by the digital signal processor 200b instead of the image processing module 153-2b in the image processing unit 150b.

The input/output position determination unit 180a sets the configuration of pipeline determined for the image processing unit 150a in the connection switching unit 151a included in the image processing unit 150a (path C72). Further, the input/output position determination unit 180a outputs the information on the determined configuration of the pipeline to the image processing unit 150b to the communication interface unit 192a, and sets it to the connection switching unit 151b provided in the image processing unit 150b via the communication interface unit 192a and the communication interface unit 191b (path C73).

In the image processing device 10a and the image processing device 10b, each component performs image processing with the configuration of the pipeline set by the input/output position determination unit 180a. In the imaging device 4 as well as the imaging device 2 and the imaging device 3, the respective components provided in the image processing device 10a and the image processing device 10b perform the respective image processing in parallel, so that the entire image processing in the imaging device 4 is performed smoothly. That is, in the imaging device 4 as well as the imaging device 2 and the imaging device 3, the preprocessing performed by the imaging processing unit 130a included in the image processing device 10a, the pipeline processing shared by the processing units 150 included in each of the image processing device 10a and the image processing device 10b, and the display processing by the display processing unit 210a included in the image processing device 10a are performed in parallel at the same time. However, in the description of the flow of image data shown in FIG. 5 as well as the description of the flow of image data shown in FIG. 3 and FIG. 4, to facilitate the description, the flow of data will be described focusing on image data of one frame. In the flow of image data shown in FIG. 5, processing is performed in the following flow.

(Flow F81): First, the imager interface unit 120a included in the image processing device 10a receives a pixel signal output from an imager (not shown), and outputs (transmits)

it to the imaging processing unit 130a. Then, the imaging processing unit 130a performs preprocessing on pixel data output from the imager interface unit 120a, and writes (stores) the image data including the pixel data subjected to the preprocessing to the DRAM 70a by DMA via the DMA bus 110a.

(Flow F82): Subsequently, the input DMA module 152a in the image processing unit 150a included in the image processing device 10a reads the image data stored in the DRAM 70a by DMA via the DMA bus 110a. Then, the input DMA module 152a outputs the read image data to the image processing module 153-1a, which is the connection destination to which image processing is to be performed next, via the connection switching unit 151a.

(Flow F83): Subsequently, the image processing module 153-1a performs predetermined image processing on the image data output from the input DMA module 152a, which is the connection destination, via the connection switching unit 151a, and outputs the processed image data subjected to the image processing to the input/output module 154a via the connection switching unit 151a.

(Flow F84): Subsequently, the input/output module 154a directly outputs the processed image data output from the image processing module 153-1a, which is the connection destination, via the connection switching unit 151a directly to the external output interface unit 162a without passing through the DMA bus 110a.

(Flow F85): Thereby, the external output interface unit 162a outputs (transmits) the processed image data output from the input/output module 154a, that is, the processed image data processed by the image processing module 153-1a, to the image processing device 10b provided in the external input interface unit 161b.

(Flow F86): Thereby, the external input interface unit 161b receives the processed image data output (transmitted) from the external output interface unit 162a, that is, the processed image data processed by the image processing module 153-1a, and directly outputs (transmits) the received processed image data to the input/output module 154b provided in the image processing unit 150b without passing through the DMA bus 110b.

(Flow F87): Subsequently, the input/output module 154b outputs the processed image data output (transmitted) from the external input interface unit 161b to the output DMA module 155b via the connection switching unit 151b.

(Flow F88): Subsequently, the output DMA module 155b writes (stores) the processed image data output from the input/output module 154b, which is the connection destination, via the connection switching unit 151b to the DRAM 70b by DMA via the DMA bus 110b.

(Flow F89): Subsequently, the digital signal processor 200b reads the processed image data stored in the DRAM 70b by DMA via the DMA bus 110b. Then, the digital signal processor 200b performs predetermined DSP image processing on the read processed image data, and writes (stores) the processed image data (DSP-processed image data) subjected to the DSP image processing in the DRAM 70b by DMA via the DMA bus 110b.

(Flow F90): Subsequently, the input DMA module 152b in the image processing unit 150b included in the image processing device 10b reads the processed image data stored in the DRAM 70b, that is, the DSP-processed image data processed by the digital signal processor 200b by the DSP by DMA via the DMA bus 110b. Then, the input DMA module 152b outputs the read DSP-processed image data to the input/output module 154b via the connection switching unit 151b.

(Flow F91): Subsequently, the input/output module 154b outputs the DSP-processed image data output from the input DMA module 152b, which is the connection destination, via the connection switching unit 151b, directly to the external output interface unit 162b without passing through the DMA bus 110b.

(Flow F92): Thereby, the external output interface unit 162b causes the DSP-processed image data output from the input/output module 154b, that is, the DSP-processed image data subjected to DSP image processing by the digital signal processor 200b, to output (transmit) to the external input interface unit 161a provided in the image processing device 10a.

(Flow F93): Thereby, the external input interface unit 161a receives the DSP-processed image data output (transmitted) from the external output interface unit 162b, that is, the DSP-processed image data subjected to DSP image processing by the digital signal processor 200b, and outputs (transmits) the received DSP processed image data directly to the input/output module 154a provided in the image processing unit 150a without passing through the DMA bus 110a.

(Flow F94): Subsequently, the input/output module 154a causes the DSP processed image data output (transmitted) from the external input interface unit 161a to output to the image processing module 153-3a, which is the connection destination to which image processing is to be performed next, via the connection switching unit 151a.

(Flow F95): Subsequently, the image processing module 153-3a performs predetermined image processing on DSP-processed image data output from the input/output module 154a, which is the connection destination, via the connection switching unit 151a, and outputs the processed image data subjected to the image processing to the output DMA module 155a via the connection switching unit 151a. Here, the image processing module 153-3a performs image processing for generating image data for display according to the DSP-processed image data output from the input/output module 154a, that is, DSP-processed image data subjected to DSP image processing by the digital signal processor 200b. Therefore, the image processing module 153-3a outputs the image data for display to the output DMA module 155a via the connection switching unit 151a.

(Flow F96): Subsequently, the output DMA module 155a writes (stores) the processed image data (image data for display) output from the image processing module 153-3a, which is the connection destination, via the connection switching unit 151a in the DRAM 70a by DMA via the DMA bus 110a.

(Flow F97): Subsequently, the display processing unit 210a reads out the display image data stored in the DRAM 70a by DMA via the DMA bus 110a. Then, the display processing unit 210a performs a predetermined display processing on the read image data for display, and generates display image data according to the image data for display. Thereafter, the display processing unit 210a outputs the generated display image data to the video interface unit 220a. Thus, the display device (not shown) displays a display image according to the display image data output from the display processing unit 210a via the video interface unit 220a.

Thus, in the imaging device 4, by the configuration of the operation detection unit 170a and the input/output position determination unit 180a included in the image processing device 10a, the configuration of pipeline is set for incorporating DSP image processing by the digital signal processor 200 into pipeline processing to be shared and performed by the image processing unit 150a included in the image processing device 10a and the image processing unit 150b included in the image processing device 10b. Thus, as shown in the fourth operation example, in the imaging device 4, by the configuration of pipeline set by the configuration of the operation detection unit 170a and the input/output position determination unit 180a, the image processing unit 150a provided in the image processing device 10a and the image processing unit 150b provided in the image processing device 10b perform pipeline processing incorporating DSP image processing by the digital signal processor 200. More specifically, in the imaging device 4, the image processing device 10a performs preprocessing by the imaging processing unit 130a and image processing by the image processing module 153-1a provided in the image processing unit 150a, as a part of pipeline processing, on pixel signals output from an imager (not shown) provided in the imaging device 4. Further, in the imaging device 4, DSP image processing by the digital signal processor 200b instead of the image processing module 153-2b, which is provided in the image processing unit 150b, is performed as a part of pipeline processing. Furthermore, in the imaging device 4, image processing by the image processing module 153-3a included in the image processing unit 150a and display processing by the display processing unit 210a are performed as part of pipeline processing, and display image according to the display image data is displayed on a display device (not shown).

As described above, the imaging device includes a plurality of image processing devices 10. Thereby, a series of image processing in the pipeline processing included in the entire processing performed by the imaging device can be shared and performed by the image processing unit 150 included in each of the plurality of image processing devices 10. Further, in the image processing device 10, the DSP image processing by the digital signal processor 200 provided in any of the image processing devices 10 can be incorporated into pipeline processing shared by the image processing unit 150 provided in each of the plurality of image processing devices 10. At this time, with the configuration of the operation detection unit 170 and the input/output position determination unit 180 provided in any one image processing device 10, the configuration of the pipeline in the image processing unit 150 provided in each image processing device 10 can be dynamically changed (set) according to the content of the entire processing performed by the imaging device. As a result, in one image processing device 10, even when it is considered difficult to secure the bus bandwidth of the DMA bus 110 necessary for performing a large number of image processing in the imaging device, by sharing the pipeline processing by the components included in each of the plurality of image processing devices 10, it is possible to secure the necessary bus bandwidth of the DMA bus 110 as the entire imaging device, and it is possible to perform a lot of image processing in the imaging device.

In the imaging device 4 shown in the fourth operation example, the case where two image processing devices 10 having the same configuration are provided has been described. Then, in the imaging device 4 shown in the fourth operation example, the case was described where the image processing device 10a and the image processing device 10b are connected in an annular shape (ring shape) in order to incorporate DSP image processing by the digital signal processor 200b provided in the image processing device 10b into pipeline processing. However, the number of image processing devices 10 constituting the imaging device is not limited to two shown in the imaging device 4 shown in the fourth operation example. Then, in the imaging device provided with a plurality of image processing devices 10, the configuration in which the respective image processing devices 10 are connected in an annular shape (ring shape) is not limited to the configuration for incorporating DSP image processing by the digital signal processor 200 or external image processing by the external image processing device outside the image processing device 10 into pipeline processing. That is, in the imaging device including the plurality of image processing devices 10, the configuration in which the image processing devices 10 are connected in an annular shape (ring shape) is not limited to the configuration incorporating image processing for providing extensibility into the image processing performed in the pipeline processing by the respective image processing units 150, and may be applied as a configuration for realizing other functions in the imaging device. For example, when realizing a function of continuously shooting a plurality of still images of a subject in an imaging device, so-called continuous shooting function, each image processing device 10 may be connected in an annular shape (ring shape). In this case, separate image processing devices 10 can perform image processing on pixel data of one frame output from an imager (not shown) for each shooting, and image data for recording (recording image data) generated by each of the image processing devices 10 can be collected (consolidated) in the DRAM 70 corresponding to any one of the image processing devices 10. That is, generation of image data for recording (recording image data) according to pixel data of respective frames captured continuously can be shared by the plurality of image processing devices 10. As a result, it is possible to speed up the continuous shooting function in the imaging device.

In the imaging device 2 shown in the second operation example, the imaging device 3 shown in the third operation example, and the imaging device 4 shown in the fourth operation example, the case has been described in which, by passing through the external input interface unit 161 and the external output interface unit 162, each of the input/output modules 154 provided in the two image processing devices 10 directly input and output image data and the two image processing devices 10 share the pipeline processing. However, as described above, the function of the input/output module 154 for directly inputting/outputting image data to/from the outside of the image processing device 10 is a function for incorporating external image processing, which is not performed in any of the image processing modules 153 provided in the image processing unit 150, by the external image processing device external to the image processing device 10 into pipeline processing. That is, the function of the input/output module 154 to directly input/output image data to/from the outside of the image processing device 10 is a function for extending the pipeline processing in the image processing unit 150 by incorporating external image processing, which is different from the image processing performed by the image processing device 10, by the external image processing device into the pipeline processing.

Fifth Operation Example

Next, as a fifth operation example of still another operation of each of the image processing devices 10, in the case where the imaging device 1 is provided with a plurality of image processing devices 10, a flow of data will be described when an external image processing device is provided and the processing of the imaging device 1 performed by each image processing device 10 is expanded. In the fifth operation example, an imaging device 1 will be considered having a configuration of expanding pipeline processing in the processing unit 150, by connecting an external image processing device, which realizes an image processing function not provided in the image processing unit 150 of each image processing device 10, between the respective image processing devices 10. In the following description, in order to distinguish from the imaging device 1 having the configuration of one image processing device 10 shown in FIG. 1, the imaging device 2 shown in FIG. 3, the imaging device 3 shown in FIG. 4, and the imaging device 4 shown in FIG. 5, the imaging device 1 having the configuration of the fifth operation example described above is referred to as "imaging device 5".

Figure 6:
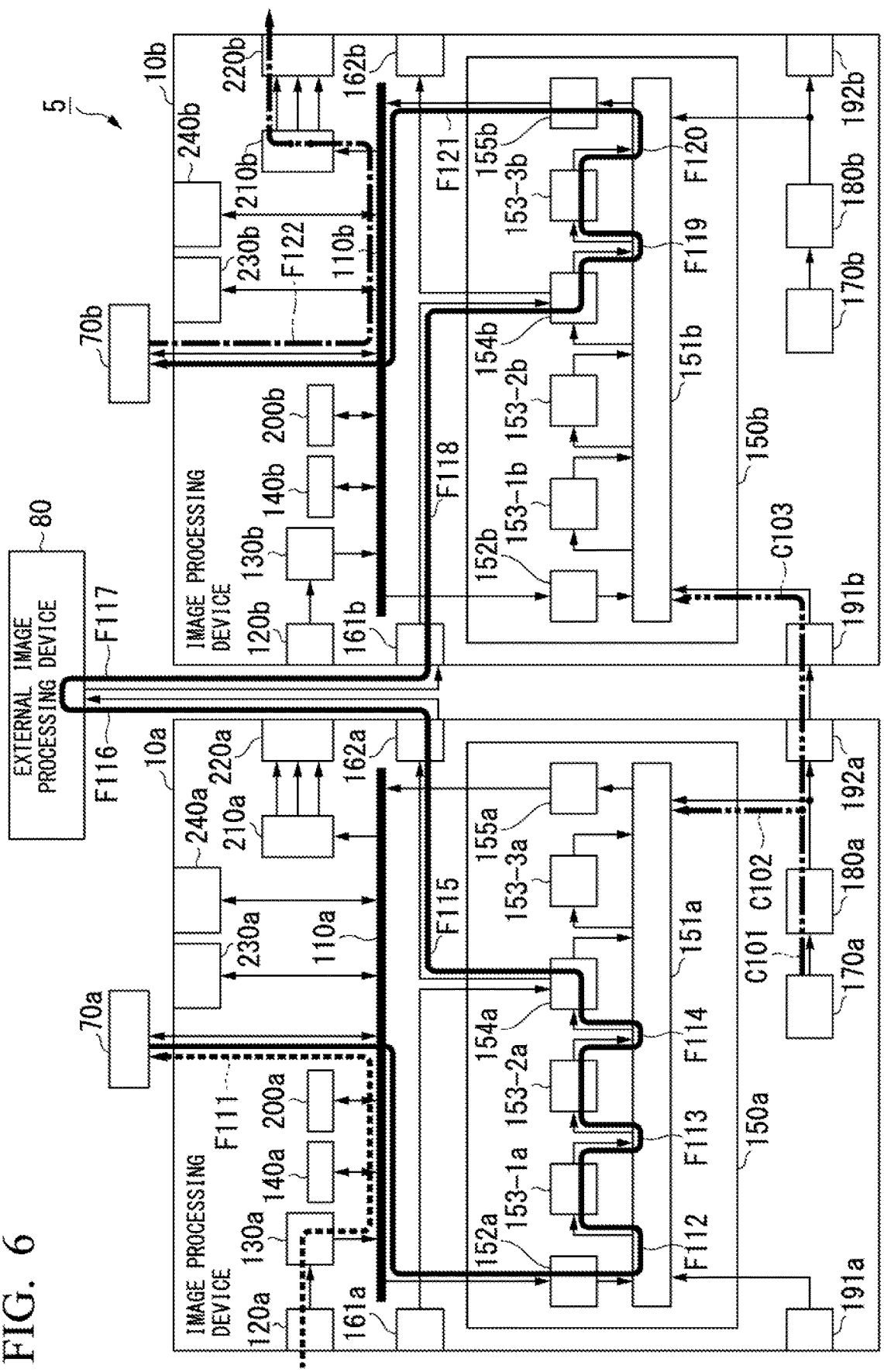
FIG. 6 is a view schematically showing the flow of data in an imaging device having a plurality of image processing devices according to the embodiment of the present invention and further having an image processing device provided outside.

FIG. 6 is a diagram schematically showing the flow of data in the imaging device 5 configured to include a plurality of image processing devices 10 according to the embodiment of the present invention and further include an image processing device (external image processing device 80) provided outside. Similarly to the imaging device 2 shown in FIG. 3, the imaging device 3 shown in FIG. 4, and the imaging device 4 shown in FIG. 5, the imaging device 5 shown in FIG. 6 has two image processing devices 10 having the same configuration. The configuration of the imaging device 5 shown in FIG. 6 is the same configuration as the imaging device 2 shown in FIG. 3, the imaging device 3 shown in FIG. 4, and the imaging device 4 shown in FIG. 5 except that the external image processing device 80 is provided between two image processing devices 10. Accordingly, in the imaging device 5 shown in FIG. 6, each component is distinguished based on the same idea as the imaging device 2 shown in FIG. 3, the imaging device 3 shown in FIG. 4, and the imaging device 4 shown in FIG. 5.

The external image processing device 80 realizes an external image processing function different from the image processing function realized by the image processing unit 150 provided in each of the image processing device 10a and the image processing device 10b. The external image processing device 80 is realized by, for example, a field programmable gate array (FPGA), a large scale integration (LSI), an application specific integrated circuit (ASIC), or the like.

In the imaging device 5 shown in FIG. 6, the external output interface unit 162a provided in the image processing device 10a and the input terminal of the external image processing device 80 are connected, and the output terminal of the external image processing device 80 and the external input interface unit 161b provided in the image processing device 10b are connected, thereby a configuration is realized in which external image processing by the external image processing device 80 is incorporated into pipeline processing. Further, in the imaging device 5 shown in FIG. 6, the communication interface unit 192a provided in the image processing device 10a and the communication interface unit 191b provided in the image processing device 10b are connected, thereby a configuration for setting the configuration of the pipeline is realized, which is for incorporating the external image processing by the external image processing device 80, in the pipeline processing to be shared and performed by the image processing unit 150a provided in the image processing device 10a and the image processing unit 150b provided in the image processing device 10b.

Even in the setting of the configuration of the pipeline in the imaging device 5, in the same way as in the imaging device 2, the imaging device 3, and the imaging device 4, first, in the configuration in which the image processing device 10a and the image processing device 10b are connected, the motion detection unit 170a provided in the image processing device 10a detects the operation of each component. More specifically, as the imaging operation in the image processing device 10a, the operation detection unit 170a detects operations of the imager interface unit 120a and the imaging processing unit 130a set corresponding to an imager (not shown) having a moderate number of pixels (size) and a high frame rate. In addition, as the display operation in the image processing device 10b, the operation detection unit 170a detects operations of the display processing unit 210b and the video interface unit 220b that are set corresponding to one (one channel output) display device (not shown) that displays an image with a low resolution. Also, as the operation of image processing in the image processing unit 150 provided in the image processing device 10a and the image processing device 10b, the operation detection unit 170a detects the operations of the input DMA module 152, the image processing modules 153-1 to 153-3, the input/output module 154, and the output DMA module 155. At this time, the operation detection unit 170a may detect the operation of the external image processing device 80 as an operation of additional image processing in the image processing unit 150 provided in the image processing device 10a and the image processing device 10b. At this stage, in the same way as in the imaging device 2, the imaging device 3, and the imaging device 4, the operation detection unit 170a does not determine whether the input DMA module 152, the image processing modules 153-1 to 153-3, the input/output module 154, the output DMA module 155, and the external image processing device 80 are components provided in the image processing device 10a, components provided in the image processing device 10b, or components provided outside the image processing device 10a and the image processing device 10b. The operation detection unit 170a outputs the detected motion information of each component to the input/output position determination unit 180a provided in the image processing device 10a (path C101).

As a result, the input/output position determination unit 180a determines the configuration of the pipeline performing pipeline processing by the image processing unit 150a, the external image processing device 80, and the image processing unit 150b, based on the operation information output from the operation detection unit 170a. Here, the operation information output from the operation detection unit 170a indicates that the DMA bus 110a in the image processing device 10 does not require much bus bandwidth, since the imager (not shown) provided in the imaging device 5 is an imager having a medium number of pixels (size) and a not-high frame rate. Further, the operation information output from the operation detection unit 170a indicates that the DMA bus 110b in the device 10b does not need much bus bandwidth, since the display device (not shown) provided in the imaging device 5 is one (one-channel output) display device that displays an image of low resolution. Further, the operation information output from the operation detecting unit 170a indicates that the external image processing by the external image processing device 80 to be incorporated into the pipeline processing does not access the DRAM 70 by DMA, that is, the DMA bus 110a in the image processing device 10a and the DMA bus 110b in the image processing device 10b do not require a bus band. Also, the operation information output from the operation detection unit 170a indicates that the external image processing by the external image processing device 80 is to be incorporated between the image processing module 153-2 and the image processing module 153-3 in pipeline processing. Therefore, the input/output position determination unit 180a determines the configuration of the pipeline in the image processing unit 150a and the image processing unit 150b, in which the external image processing by the external image processing device 80 is incorporated between the image processing by the image processing module 153 performed in the image processing unit 150a provided in the image processing device 10a and the image processing by the image processing module 153 performed in the image processing unit 150b provided in the image processing device 10b. More specifically, in the flow of the image data shown in FIG. 6, the input/output position determination unit 180a determines the configuration of the pipeline in the image processing unit 150a, on which image processing is performed by each of the image processing module 153-1a and the image processing module 153-2a in the image processing unit 150a. Further, in the flow of image data shown in FIG. 6, the input/output position determination unit 180a determines the configuration of the pipeline in the image processing unit 150b, on which image processing is performed by the image processing module 153-3b in the image processing unit 150b.

The input/output position determination unit 180a sets the pipeline configuration determined for the image processing unit 150a to the connection switching unit 151a provided in the image processing unit 150a (path C102). Further, the input/output position determination unit 180a outputs the information on the configuration of the pipeline determined for the image processing unit 150b, to the communication interface unit 192a, and sets to the connection switching unit 151b provided in the image processing unit 150b via the communication interface unit 192a and the communication interface unit 191b (path C103).

In the image processing device 10a and the image processing device 10b, each component performs image processing with the configuration of the pipeline set by the input/output position determination unit 180a. Also, in the imaging device 5, in the same way as in the imaging device 2, the imaging device 3 and the imaging device 4, the respective components provided in the image processing device 10a and the image processing device 10b perform the respective image processing in parallel, thereby the entire image processing in the imaging device 5 is smoothly performed. That is, in the imaging device 5 as well as the imaging device 2, the imaging device 3, and the imaging device 4, preprocessing by the imaging processing unit 130a provided in the image processing device 10a, pipeline processing performed by the image processing unit 150 provided in the image processing device 10a, the external image processing device 80, and the image processing unit 150 provided in the image processing device 10b, and display processing performed by the display processing unit 210b provided in the image processing device 10b are performed in parallel at the same time. However, in the description of the flow of image data shown in FIG. 6 as well as the description of the flow of image data shown in FIG. 3 to FIG. 5, for ease of explanation, the flow of data will be described by focusing on one frame of image data. In the flow of image data shown in FIG. 6, processing is performed in the following flow.

(Flow F111): First, the imager interface unit 120a included in the image processing device 10a receives a pixel signal output from an imager (not shown) and outputs (transmits) it to the imaging processing unit 130a. Then, the imaging processing unit 130a performs preprocessing on pixel data output from the imager interface unit 120a, and writes (stores) image data including each pixel data subjected to the preprocessing in the DRAM 70a by DMA via the DMA bus 110a.

(Flow F112): Subsequently, the input DMA module 152a in the image processing unit 150a included in the image processing device 10s reads the image data stored in the DRAM 70a by DMA via the DMA bus 110a. Then, the input DMA module 152a outputs the read image data to the image processing module 153-1a of the connection destination to which image processing is to be performed next, via the connection switching unit 151a.

(Flow F113): Subsequently, the image processing module 153-1a performs predetermined image processing on the image data output from the input DMA module 152a of the connection destination via the connection switching unit 151a, and outputs the processed image data after the image processing to the image processing module 153-2a of the connection destination to which image processing is to be performed next, via the connection switching unit 151a.

(Flow F114): Subsequently, the image processing module 153-2a performs predetermined image processing on the processed image data output from the image processing module 153-1a of the connection destination via the connection switching unit 151a, and outputs the processed image data to which image processing is further performed, to the input/output module 154a via the connection switching unit 151a.

(Flow F115): Subsequently, the input/output module 154a directly outputs the processed image data output from the image processing module 153-2a of the connection destination via the connection switching unit 151a without passing through the DMA bus 110a, to the external output interface unit 162a.

(Flow F116): Thus, the external output interface unit 162a outputs (transmits) the processed image data output from the input/output module 154a, that is, the processed image data processed by the image processing module 153-2a, to the external image processing device 80.

(Flow F117): Thereby, the external image processing device 80 receives the processed image data output (transmitted) from the external output interface unit 162a, that is, the processed image data processed by the image processing module 153-2a, performs predetermined external image processing on the received processing image data, and outputs (transmits) the external processing image data subjected to the external image processing to the external input interface unit 161b provided in the image processing device 10b.

(Flow F118): Thereby, the external input interface unit 161b receives the processed image data output (transmitted) from the external image processing device 80, that is, the externally processed image data externally processed by the external image processing device 80, and outputs (transmits) the received processed image data directly to the input/output module 154b provided in the image processing unit 150b without passing through the DMA bus 110b.

(Flow F119): Subsequently, the input/output module 154b outputs the externally processed image data output (transmitted) from the external input interface unit 161b, to the image processing module 153-3b of the connection destination to perform the next image processing, via the connection switching unit 1516b.

(Flow F120): Subsequently, the image processing module 153-3b performs predetermined image processing on the externally processed image data output from the input/output module 154b of the connection destination via the connection switching unit 151b, and outputs the processed image data after image processing to the output DMA module 155*b* via the connection switching unit 151*b*. Here, it is assumed that the image processing module 153-3*b* performs image processing for generating image data for display in accordance with the externally processed image data output from the input/output module 154*b*, that is, the externally processed image data subjected to external image processing by the external image processing device 80. Therefore, the image processing module 153-3*b* outputs the image data for display to the output DMA module 155*b* via the connection switching unit 151*b*.

(Flow F121): Subsequently, the output DMA module 155*b* writes (stores) the processed image data (image data for display) output from the image processing module 153-3*b* of the connection destination via the connection switching unit 151*b*, in the DRAM 70*b* by DMA via the DMA bus 110*b*.

(Flow F122): Subsequently, the display processing unit 210*b* reads out the display image data stored in the DRAM 70*b* by DMA via the DMA bus 110*b*. Then, the display processing unit 210*b* performs predetermined display processing on the read image data for display, and generates display image data according to the image data for display. Thereafter, the display processing unit 210*b* outputs the generated display image data to the video interface unit 220*b*. Thus, the display device (not shown) displays a display image according to the display image data output from the display processing unit 210*b* via the video interface unit 220*b*.

Thus, in the imaging device 5, by the configuration of the operation detection unit 170*a* and the input/output position determination unit 180*a* provided in the image processing device 10*a*, a pipeline configuration is set that is for incorporating external image processing by the external image processing device 80 in pipeline processing that is shared by the image processing unit 150*a* included in the image processing device 10*a* and the image processing unit 150*b* included in the image processing device 10*b*. Thereby, in the imaging device 5, as shown in the fifth operation example, by the configuration of the pipeline set by the configuration of the operation detection unit 170*a* and the input/output position determination unit 180*a*, the image processing unit 150*a* provided in the image processing device 10*a* and the image processing unit 150*b* provided in the image processing device 10*b* perform pipeline processing in which external image processing by the external image processing device 80 is incorporated. More specifically, in the imaging device 5, the image processing device 10*a* performs preprocessing by the imaging processing unit 130*a* and image processing by the image processing module 153-1*a* and the image processing module 153-2*a* provided in the image processing unit 150*a* as part of pipeline processing, on pixel signals output from an imager (not shown) provided in the imaging device 5. Further, in the imaging device 5, external image processing by the external image processing device 80 is performed as part of pipeline processing. Further, in the imaging device 5, as part of pipeline processing, image processing by the image processing module 153-3*b* provided in the image processing unit 150*b* and display processing by the display processing unit 210*b* are performed, and display image corresponding to the display image data is displayed on a display device (not shown).

As described above, a plurality of image processing devices 10 are provided in the imaging device, so that it is possible to perform a plurality of image processing in the pipeline processing included in the entire processing performed by the imaging device by being shared by the image processing unit 150 provided in each of the plurality of image processing devices 10. In addition, the image processing device 10 can adopt a configuration in which external image processing by the external image processing device 80 is incorporated into pipeline processing that is shared and performed by the image processing unit 150 provided in each of the plurality of image processing devices 10. At this time, by the configuration of the operation detection unit 170 and the input/output position determination unit 180 provided in any one image processing device 10, it is possible to dynamically change (set) the configuration of the pipeline in the image processing unit 150 provided in each image processing device 10 according to the content of the entire processing performed by the imaging device. As a result, in one image processing device 10, even in the case where it is considered difficult to secure the bus bandwidth of the DMA bus 110 necessary for performing a large number of image processing in the imaging device, by sharing the pipeline processing with the components provided in each of the plurality of image processing devices 10, it is possible to secure the necessary bus bandwidth of the DMA bus 110 as a whole of the imaging device, and it is possible to perform many image processing in the imaging device.

In the imaging device 5 illustrated in the fifth operation example, the case where two image processing devices 10 having the same configuration are provided has been described. Then, in the imaging device 5 shown in the fifth operation example, the configuration has been described in which external image processing by the external external image processing device 80 is incorporated into pipeline processing between two image processing devices 10. However, the number of image processing devices 10 constituting the imaging device is not limited to two shown in the imaging device 5 shown in the fifth operation example. That is, the imaging device may be provided with more image processing devices 10. Then, in an imaging device provided with a plurality of image processing devices 10, external image processing by an external external image processing device may be incorporated between pipeline processing by each of the image processing units 150. Thus, pipeline processing by the image processing unit 150 provided in each of the image processing devices 10 provided in the imaging device can be further expanded.

Figure 7A:
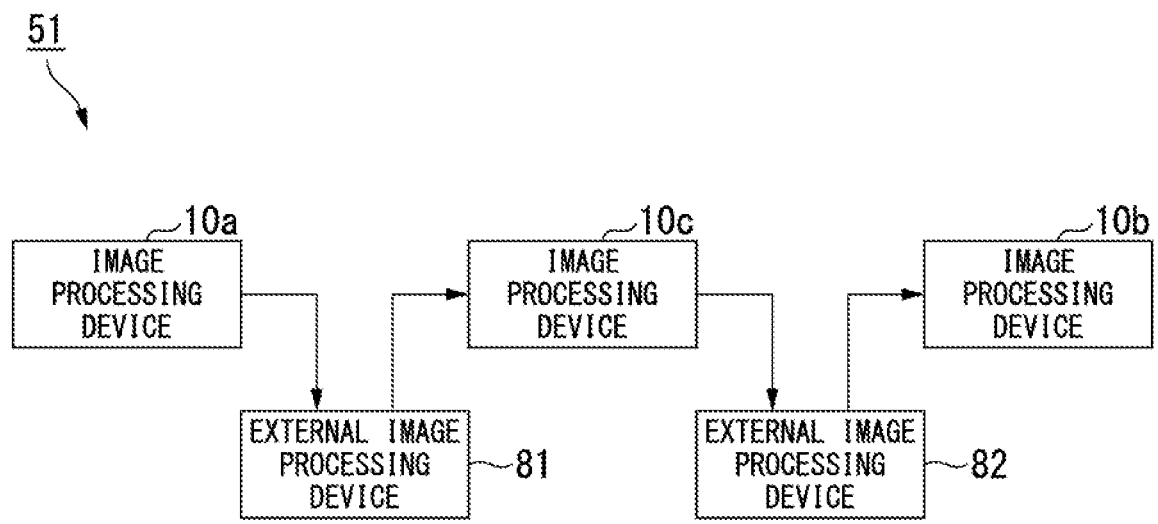
FIGS. 7A and 7B are block diagrams each schematic showing an imaging device of another configuration having a plurality of image processing devices according to the embodiment of the present invention and further performing image processing expanded by an external image processing device.
Figure 7B:
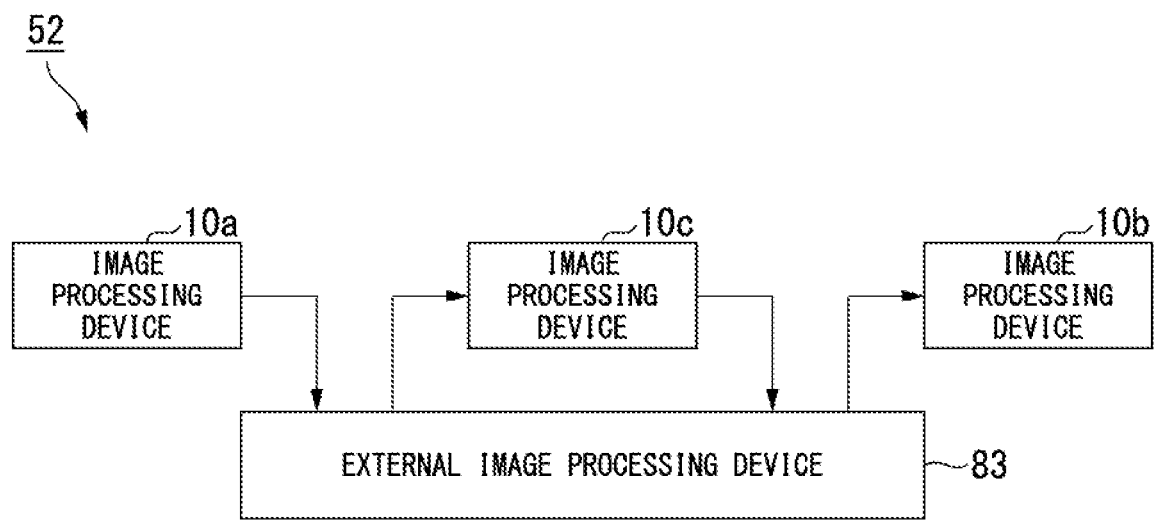

Here, in the imaging device provided with more image processing devices 10, pipeline processing by the image processing unit 150 provided in the image processing device 10 is further extended by incorporating external image processing by an external external image processing device. FIGS. 7A and 7B are block diagrams each showing a schematic configuration of an imaging device 5 having another configuration in which a plurality of image processing devices 10 according to the embodiment of the present invention are provided and further performing image processing expanded by an external image processing device.

FIGS. 7A and 7B show an example of an imaging device having a configuration in which three image processing devices 10 having the same configuration are provided as a modification of the imaging device 5 shown in FIG. 6. In the modification of the imaging device 5 shown in FIGS. 7A and 7B, in order to distinguish each of the three image processing devices 10, the image processing device 10 on the side that receives the pixel signal output from the imager (not shown) is referred to as an "image processing device 10*a*", the image processing device 10 on the side that displays a display image on a display device (not shown) is referred to as an "image processing device 10*b*", and the image processing device 10 that performs image processing between the image processing device 10a and the image processing device 10b is referred to as an "image processing device 10c". Then, in the modified example of the imaging device 5 shown in FIGS. 7A and 7B, by assigning any one of "a" indicating that it is a component of the image processing device 10a, "b" indicating that it is a component of the image processing device 10b, and "c" indicating that it is a component of the image processing device 10c following the code assigned to the respective components provided in each image processing device 10, it is distinguished whether it is a component of the image processing device 10a, the image processing device 10b, or the image processing device 10c. In the following description, when the components associated with the image processing device 10a, the components associated with the image processing device 10b, and the components associated with the image processing device 10c are not distinguished from one another, "a", "b" and "c" following the code attached to each component are not given.

In FIG. 7A, an imaging device 51 is shown having the configuration in which an external image processing device 81 is provided between the image processing device 10a and the image processing device 10c, and an external image processing device 82 is provided between the image processing device 10c and the image processing device 10b. In the imaging device 51 shown in FIG. 7A, the external output interface unit 162a provided in the image processing device 10a is connected to the input terminal of the external image processing device 81, and the output terminal of the external image processing device 81 is connected to the external input interface unit 161c provided in the image processing device 10c. Further, in the imaging device 51 shown in FIG. 7A, the external output interface unit 162c provided in the image processing device 10c is connected to the input terminal of the external image processing device 82, and the output terminal of the external image processing device 82 is connected to the external input interface unit 161b provided in the image processing device 10b. Thereby, in the imaging device 51, a configuration is realized in which external image processing by the external image processing device 81 is incorporated into pipeline processing between the image processing device 10a and the image processing device 10c, and external image processing by the external image processing device 82 is incorporated into pipeline processing between the image processing device 10c and the image processing device 10b.

The operation of each of the image processing devices 10 in the imaging device 51 shown in FIG. 7A can be easily understood from the operation (the fifth operation example) of each of the image processing devices 10 in the imaging device 5 shown in FIG. 6, or the operations (second to fourth operation examples) of the image processing device 10 in the imaging devices 2 to 4 shown in FIGS. 3 to 5. Accordingly, the detailed description of the operation of each of the image processing devices 10 in the imaging device 51 shown in FIG. 7A will be omitted.

When the external image processing device 81 and the external image processing device 82 shown in FIG. 7A are realized by an FPGA, an LSI, an ASIC or the like, it can be considered that the external image processing function realized by the external image processing device 81 and the external image processing function realized by the external image processing device 82 are combined into one external image processing device. In this case, one external image processing device may be configured to include a plurality of external input interface ports and external output interface ports according to various predetermined transmission methods such as PCI-Express.

In FIG. 7B, an imaging device 52 is shown having a configuration including one external image processing device 83 having a function of external image processing realized by the external image processing device 81 between the image processing device 10a and the image processing device 10c, and a function of external image processing realized by the external image processing device 82 between the image processing device 10c and the image processing device 10b. In the imaging device 52 shown in FIG. 7B, the external output interface unit 162a provided in the image processing device 10a and the corresponding input terminal (port) in the external image processing device 81 are connected, and the corresponding output terminal (port) in the external image processing device 81 is connected to the external input interface unit 161c provided in the image processing device 10c. Furthermore, in the imaging device 52 shown in FIG. 7B, the external output interface unit 162c provided in the image processing device 10c and the corresponding input terminal (port) in the external image processing device 82 are connected, and the corresponding output terminal (port) in the external image processing device 82 is connected to the external input interface unit 161b provided in the image processing device 10b. Thereby, in the imaging device 52 as well as the imaging device 51, a configuration is realized in which external image processing by the external image processing device 81 is incorporated in the pipeline processing between the image processing device 10a and the image processing device 10c, and external image processing by the external image processing device 82 is incorporated in the pipeline processing between the image processing device 10c and the image processing device 10b.

The operation of each of the image processing devices 10 in the imaging device 52 shown in FIG. 7B can be easily considered, as the operation in the imaging device 51 shown in FIG. 7A, from the operations of the respective image processing device 10 in the imaging device 5 shown in FIG. 6 (the fifth operation example), and the operations of the respective image processing device 10 in the imaging devices 2 to 4 shown in FIGS. 3 to 5 (the second to fourth operation example). Accordingly, a detailed description of the operation of each of the image processing devices 10 in the imaging device 52 shown in FIG. 7B will be omitted.

As for the imaging device 5 shown in FIG. 6 and the imaging device devices 51 and 52 shown in FIGS. 7A and 7B, in the same way as in the imaging device device 2 shown in FIG. 3 and the imaging device 3 shown in FIG. 4, the configuration has been described in which the image processing devices 10 are connected in series (for example, in a daisy chain connection) and an external image processing device is connected between two image processing devices 10. However, in an imaging device provided with a plurality of image processing devices 10, the configuration in which external image processing by an external image processing device is incorporated into pipeline processing is not limited to the configuration in which an external image processing device is connected between two image processing devices 10 connected in series. That is, in an imaging device provided with a plurality of image processing devices 10, the configuration in which external image processing by an external image processing device is incorporated into pipeline processing is the same as the imaging device 4 shown in FIG. 5, and the external image processing device can be connected between two image processing devices 10 even in the case where the image processing devices 10 are connected in an annular shape (ring shape).

According to the present embodiment, an image processing device (image processing device 10) includes a plurality of processing units (in the embodiment, image processing unit 130, image processing unit 150, digital signal processor 200, display processing unit 210, memory card interface unit 230, high-speed serial interface unit 240, and the like) which are connected to a common data bus (DMA bus 110) and performing predetermined processing (image processing) on data (image data) read from a data storage unit (DRAM 70) connected to the data bus via the data bus. At least one of the processing units (image processing unit 150) includes: a plurality of processing modules (image processing modules 153-1 to 153-3) that perform predetermined processing (image processing) on input data (image data); an input/output module (input/output module 154) that operates as the processing module that directly inputs data from and outputs data to outside without passing through the data bus; and a connection switching unit (connection switching unit 151) that changes a configuration of a pipeline by switching a connection between the processing modules (in the embodiment, input DMA module 152, image processing modules 153-1 to 153-3, input/output module 154, and output DMA module 155) according to input settings (settings from the input/output position determination unit 180 and control from outside of the image processing device 10 input via the communication interface unit 191), and is an image processing unit (image processing unit 150) that performs a pipeline processing by each of the processing modules constituting the pipeline. The image processing device includes: an operation detection unit (operation detection unit 170) that detects an operation of each of the processing units; an input/output position determination unit (input/output position determination unit 180) that determines the configuration of the pipeline in the image processing unit 150 based on information (operation information) on the operation of each of the processing units detected by the operation detection unit 170; an information output unit (communication interface unit 192) that outputs information on the configuration of the pipeline determined by the input/output position determination unit to outside (other image processing device 10); and an information input unit (communication interface unit 191) that receives information on the configuration of the pipeline from the outside (other image processing device 10). The connection switching unit 151 switches the connection between processing modules (in the embodiment, input DMA module 152, image processing modules 153-1 to 153-3, input/output module 154, and output DMA module 155) constituting the pipeline according to the information of the configuration of the pipeline determined by the input/output position determination unit 180 or received by the information input unit (communication interface unit 191).

Further, according to the present embodiment, the operation detection unit detects an operation involving an access to the data storage unit (DRAM 70) via the data bus (DMA bus 110) by each of the processing units, as an operation of each of the processing units. The input/output position determination unit 180 determines the configuration of the pipeline for dividing the pipeline processing to be performed in the image processing unit 150, so that a total bandwidth (bus bandwidth of the DRAM 70) of the data bus required when each of the processing units accesses the data storage unit (DRAM 70) via the data bus (DMA bus 110) is within a maximum bandwidth of the data storage unit (bus bandwidth that DRAM 70 can access) connected to the data bus (DMA bus 110).

Further, according to the present embodiment, the input/output position determination unit 180 determines a position of the input/output module 154 incorporated in the pipeline configured in the image processing unit 150, in order to divide the pipeline processing to be performed in the image processing unit 150.

Further, according to the present embodiment, in the imaging device 1, a plurality of image processing devices 10 (in the embodiment, the image processing device 10a and the image processing device 10b) are provided. An output (external output interface unit 162b) of the input/output module 154a provided in the image processing device 10a in a previous stage and an input (external input interface unit 161b) of the input/output module 154b provided in the image processing device 10b in a subsequent stage are connected, so that the image processing devices 10a and 10b are connected in a series connection. The connection switching unit (input/output module 154a and input/output module 154b) in the image processing unit 150 (image processing unit 150a and image processing unit 150b) provided in each of the image processing devices 10a and 10b switches a connection between the processing modules (in the embodiment, the input DMA module 152a, the image processing modules 153-1a to 153-3a, the input/output module 154a, the output DMA module 155a, the input DMA module 152b, the image processing module 153-1b to 153-3b, the input/output module 154b, and the output DMA module 155b) in the pipeline configured in the image processing units 150a and 150b, according to information of the configuration of the pipeline determined by the input/output position determination unit 180 (input/output position determination unit 180a) provided in any one of the image processing devices 10 (in the embodiment, the image processing device 10a).

Further, according to the present embodiment, the input/output position determination unit (input/output position determination unit 180a) provided in any one of the image processing devices 10 (image processing device 10a) determine the configuration of the pipeline including a position of the input/output module 154 (input/output module 154a or 154b) to be incorporated into the pipeline configured in each of the image processing units 150a and 150b, in order to share the pipeline processing in each of the image processing units 150a and 150b based on information on operation of each of the processing units detected by the corresponding operation detection unit (operation detection unit 170a). The information output unit (communication interface unit 192a) provided in any one of the image processing devices 10 (image processing device 10a) outputs information on the configuration of the pipeline determined by the input/output position determination unit 180a to the information input unit (communication interface unit 191b) provided in another image processing device (in the embodiment, the image processing device 10b). The input/output module 154a provided in the image processing unit 150a and the input/output module 154b provided in the image processing unit 150b incorporates the input/output module 154a or 154b into a position of the input/output module 154a or 154b included in information of the configuration of the pipeline determined by the input/output position determination unit 180a or received by the corresponding information input unit 191b, thereby switching connections between the processing modules (in the embodiment, the input DMA module 152a, the image processing modules 153-1a to 153-3a, the input/output module 154a, the output DMA module 155*a*, the input DMA module 152*b*, the image processing module 153-1*b* to 153-3*b*, the input/output module 154*b*, and the output DMA module 155*b*) in the pipeline configured in the processing units 150*a* and 150*b*.

Further, according to the present embodiment, the input/output position determination unit 180 (input/output position determination unit 180*a*) provided in any one of the image processing devices 10 (image processing device 10*a*) determines a position of the input/output module 154*a* or 154*b* to be incorporated in the pipeline configured in each of the image processing units 150*a* and 150*b*, so that a total bandwidth of the data bus (DMA bus 110*a* or DMA bus 110*b*) required when accessing the data storage unit (DRAM 70*a* or DRAM 70*b*) via the data bus (DMA bus 110*a* or DMA bus 110*b*) corresponding to each processing unit which performs processing in each image of the processing devices 10*a* and 10*b* is set within a maximum bandwidth in the data storage unit (bandwidth that DRAM 70*a* or 70*b* can be access) connected to the corresponding data bus (DMA bus 110*a* or 110*b*).

Further, according to the present embodiment, an output (external output interface unit 162*b*) of the input/output module 154*b* provided in the image processing device 10 (in the embodiment, image processing device 10*b*) in a last stage connected in the series connection and an input (external input interface unit 161*a*) of the input/output module 154*a* provided in the image processing device 10 (in the embodiment, image processing device 10*a*) in a first stage are all connected, so that all the image processing devices (image processing device 10*a* and the image processing device 10*b*) are connected in an annular shape. Data (processed image data) processed by each of the image processing devices 10*a* and 10*b* are collected in the data storage unit (DRAM 70*a*) connected to the data bus (DMA bus 110*a*) of any one of the image processing devices 10 (in the embodiment, image processing device 10*a*).

Further, according to the present embodiment, an imaging device (imaging device 1) is configured in which a plurality of image processing devices 10 (in the embodiment, the image processing device 10*a* and the image processing device 10*b*) are provided. In each of the image processing device 10*a* and the image processing device 10*b*, the output (external output interface unit 162*b*) of the input/output module 154*a* provided in the image processing device 10*a* of the previous stage and an input (external input interface unit 161*b*) of the input/output module 154*b* provided in the subsequent image processing device 10*b* in the subsequent stage are connected via an external image processing device (external image processing device 80) that performs other image processing. The connection switching units (input/output module 154*a* and input/output module 154*b*) in the image processing unit 150 (the image processing unit 150*a* and the image processing unit 150*b*) provided in each of the image processing device 10*a* and the image processing device 10*b* switches connection between processing modules in a pipeline configured in the image processing unit 150*a* and the image processing unit 150*b* (in the embodiment, connection among the input DMA module 152*a*, the image processing modules 153-1*a* to 153-3*a*, the input/output module 154*a*, and the output DMA module 155*a*, and connection among the input DMA module 152*b*, the image processing modules 153-1*b* to 153-3*b*, the input/output module 154*b*, and the output DMA module 155*b*), in accordance with information of the pipeline configuration determined by the input/output position determination unit 180 (input/output position determination unit 180*a*) included in any one of the image processing devices 10 (in the embodiment, the image processing device 10*a*).

As described above, according to the embodiment of the present invention, in the image processing unit that performs pipeline processing in the image processing device, an input/output module is provided for direct connection with components provided outside the image processing unit without passing through the DMA bus. That is, in the embodiment of the present invention, in order to extend the image processing realized in the image processing unit, an input/output module is provided for direct connection with the image processing device that performs image processing that is not realized in any image processing module provided in the image processing unit, without passing through the DMA bus. In the embodiment of the present invention, a connection switching unit is provided for switching the connection of each processing module provided in the image processing unit, that is, switching the connection of the pipeline configured in the image processing unit. Thus, in the embodiment of the present invention, by incorporating the input/output module as an image processing module in the pipeline configured in the image processing unit, image processing to be performed by components provided outside the image processing unit can be incorporated into a series of image processing by pipeline processing that each image processing module provided in the image processing unit performs.

Further, in the embodiment of the present invention, provided is the operation detection unit that detects an operation when each component provided in the image processing device performs image processing, and an input/output position determination unit that determines the configuration of the pipeline in the image processing unit based on the operation in each component detected by the operation detection unit and sets the determined configuration of the pipeline in the connection switching unit. Then, in the embodiment of the present invention, the input/output position determination unit can secure the bus bandwidth of the DMA bus required when each component provided in the image processing device performs image processing, that is, determine the configuration of the pipeline in the image processing unit that can avoid bus bandwidth compression on a specific DMA bus. Accordingly, in the embodiment of the present invention, it is possible to avoid a decrease in processing capability (speed) of image processing by each component provided in the image processing device caused by compression of the bus bandwidth of the DMA bus by the image processing unit provided in the image processing device.

Further, in the embodiment of the present invention, when the imaging device is configured by a plurality of image processing devices, pipeline is configured in which a series of image processing in pipeline processing is shared and performed by the image processing units provided in the plurality of respective image processing devices. Thereby, in the embodiment of the present invention, even when a lot of image processing is performed as the entire processing in the imaging device, it is possible to avoid a decrease in processing capability (speed) of image processing by respective components provided in the image processing device caused by compression of the bus bandwidth of the DMA bus by the image processing unit provided in any of the image processing devices.

In the embodiment of the present invention, the imaging device including two or three image processing devices has been described. However, the number of image processing devices provided in the imaging device is not limited to two or three as described above. That is, an imaging device provided with more image processing devices may be configured. In this case, one of the image processing devices 10 determines the configuration of the pipeline in the image processing unit 150 provided in each of the image processing devices 10 provided in the imaging device 1, in the same manner as the image processing device 10a described in the embodiment of the present invention. Then, the image processing device 10 having determined the configuration of the pipeline outputs (transmits) information on the determined configuration of the pipeline to the other image processing device 10 via the communication interface unit 192, and each of the other image processing devices 10 configures a pipeline in the image processing unit 150 according to the information of the configuration of the pipeline output from the image processing device 10 that has determined the configuration of the pipeline.

In the embodiment of the present invention, the case where the pipeline is configured in the image processing device has been described. However, as the processing device that performs a series of processing by the pipeline configuration, various processing devices other than the image processing device can be considered. In addition to the imaging device, various systems may be considered as systems requiring sharing of a series of processes by the pipeline configuration. Therefore, the processing device or system to which the concept of the present invention can be applied is not limited to the image processing device or imaging device shown in the embodiment of the present invention. The concept of the present invention can be applied similarly to a system equipped with a processing device for performing pipeline processing by a pipeline configured by connecting a plurality of processing modules in series, to obtain the same effect as that of the present invention.

Although the preferred embodiments of the present invention have been described above, the present invention is not limited to these embodiments and their modifications. Additions, omissions, substitutions, and other modifications can be made without departing from the spirit of the present invention.

Also, the present invention is not limited by the above description, and is limited only by the scope of the attached claims.

What is claimed is:

1. An image processing device comprising:
  a plurality of processing units which are connected to a common data bus and performing predetermined processing on data read from a data storage unit connected to the data bus via the data bus,
  at least one of the processing units including
    a plurality of processing modules that are configured to perform predetermined processing on input data,
    an input/output module that is configured to operate as the processing module that directly inputs data from and outputs data to outside without passing through the data bus, and
    a connection switching unit that is configured to change a configuration of a pipeline by switching a connection between the processing modules according to input settings,
  the processing unit performing a pipeline processing by each of the processing modules constituting the pipeline,
  the image processing device further includes:
    an operation detection unit that is configured to detect an operation of each of the processing units;
    an input/output position determination unit that is configured to determine the configuration of the pipeline in the image processing unit according to information on the operation of each of the processing units detected by the operation detection unit;
    an information output unit that is configured to output information on the configuration of the pipeline determined by the input/output position determination unit to outside; and
    an information input unit that is configured to receive information on the configuration of the pipeline from the outside, and
  the connection switching unit is configured to switch the connection between processing modules constituting the pipeline according to the information of the configuration of the pipeline determined by the input/output position determination unit or received by the information input unit.

2. The image processing device according to claim 1, wherein
  the operation detection unit is configured to detect an operation involving an access to the data storage unit via the data bus by each of the processing units, as an operation of each of the processing units, and
  the input/output position determination unit is configured to determine the configuration of the pipeline for dividing the pipeline processing to be performed in the image processing unit, so that a total bandwidth of the data bus required when each of the processing units accesses the data storage unit via the data bus is within a maximum bandwidth of the data storage unit connected to the data bus.

3. The image processing device according to claim 2, wherein
  the input/output position determination unit is configured to determine a position of the input/output module incorporated in the pipeline configured in the image processing unit, to divide the pipeline processing to be performed in the image processing unit.

4. An imaging device comprising a plurality of image processing devices according to claim 2, wherein
  an output of the input/output module provided in the image processing device in a previous stage and an input of the input/output module provided in the image processing device in a subsequent stage are connected, so that the image processing devices are connected in a series connection, and
  the connection switching unit in the image processing unit provided in each of the image processing devices is configured to switch a connection between the processing modules in the pipeline configured in the image processing unit, according to information of the configuration of the pipeline determined by the input/output position determination unit provided in any one of the image processing devices.

5. The imaging device according to claim 4, wherein
  the input/output position determination unit provided in any one of the image processing devices is configured to determine the configuration of the pipeline including a position of the input/output module to be incorporated into the pipeline configured in each of the image processing units, in order to share the pipeline processing in each of the image processing units according to information on operation of each of the processing units detected by the corresponding operation detection unit, the information output unit provided in any one of the image processing devices outputs information on the configuration of the pipeline determined by the input/output position determination unit to the information input unit provided in another image processing device, and the connection switching unit in the image processing unit provided in each of the image processing devices incorporates the input/output module into a position of the input/output module included in information of the configuration of the pipeline determined by the input/output position determination unit or received by the corresponding information input unit, thereby switching connections between the processing modules in the pipeline configured in the processing unit.

6. The imaging device according to claim 5, wherein the input/output position determination unit provided in any one of the image processing devices is configured to determine a position of the input/output module to be incorporated in the pipeline configured in each of the image processing units, so that a total bandwidth of the data bus required when accessing the data storage unit via the data bus corresponding to each processing unit which performs processing in each of the image processing devices is set within a maximum bandwidth in the data storage unit connected to the corresponding data bus.

7. The imaging device according to claim 6, wherein an output of the input/output module provided in the image processing device in a last stage connected in the series connection and an input of the input/output module provided in the image processing device in a first stage are all connected, so that all the image processing devices are connected in an annular shape, and data processed by each of the image processing devices are collected in the data storage unit connected to the data bus of any one of the image processing devices.

8. An imaging device comprising a plurality of the image processing devices according to claim 2, wherein, in each of the image processing devices, an output of the input/output module provided in the image processing device of a previous stage and an input of the input/output module provided in the image processing device of a subsequent stage are connected via an external image processing device that is configured to perform other image processing, the connection switching unit in the image processing unit provided in each of the image processing devices is configured to switch a connection between the processing modules in the pipeline configured in the image processing unit, according to information of configuration of the pipeline determined by the input/output position determination unit provided in any one of the image processing devices.

* * * * *

UNITED STATES PATENT AND TRADEMARK OFFICE
CERTIFICATE OF CORRECTION

| | | |
|---|---|---|
| PATENT NO. | : 11,468,539 B2 | |
| APPLICATION NO. | : 16/733404 | |
| DATED | : October 11, 2022 | |
| INVENTOR(S) | : Keisuke Nakazono et al. | |

It is certified that error appears in the above-identified patent and that said Letters Patent is hereby corrected as shown below:

On the Title Page

Add
(30) Foreign Application Priority Data
July 24, 2017 (JP) .................................. PCT/JP2017/026672

Signed and Sealed this
Tenth Day of January, 2023

Katherine Kelly Vidal
*Director of the United States Patent and Trademark Office*